(12) United States Patent
Nishida

(10) Patent No.: US 11,218,673 B2
(45) Date of Patent: Jan. 4, 2022

(54) PROJECTION-TYPE DISPLAY APPARATUS

(71) Applicant: SEIKO EPSON CORPORATION, Tokyo (JP)

(72) Inventor: Masakazu Nishida, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/925,554

(22) Filed: Jul. 10, 2020

(65) Prior Publication Data

US 2021/0014462 A1 Jan. 14, 2021

(30) Foreign Application Priority Data

Jul. 12, 2019 (JP) .............................. JP2019-129993

(51) Int. Cl.
*H04N 9/31* (2006.01)
*G02F 1/13* (2006.01)
*G03B 21/00* (2006.01)

(52) U.S. Cl.
CPC ........... *H04N 9/315* (2013.01); *G02F 1/1326* (2013.01); *G03B 21/00* (2013.01); *G03B 21/005* (2013.01); *G03B 21/006* (2013.01)

(58) Field of Classification Search
CPC .. G03B 21/005; G03B 21/006; G03B 21/008; G03B 21/145; G03B 21/208; G03B 21/2013; G03B 21/2033; H04N 9/315; H04N 9/3105; H04N 9/3126; H04N 9/3141; H04N 9/3161; H04N 9/3164; G02F 1/13; G02F 1/133; G02F 1/1326; G02F 1/1333; G02F 1/1334; G02F 1/1339; G02F 1/1368; G02F 1/13718; G02F 1/133377; G02F 1/133362
See application file for complete search history.

(56) References Cited

U.S. PATENT DOCUMENTS

| | | | |
|---|---|---|---|
| 9,075,276 B2 * | 7/2015 | Tateno | G02F 1/136213 |
| 2001/0013920 A1 * | 8/2001 | Hashimoto | G02F 1/1339 |
| | | | 349/187 |
| 2008/0252835 A1 | 10/2008 | Motomatsu et al. | |
| 2011/0096233 A1 * | 4/2011 | Horiguchi | H04N 9/3182 |
| | | | 348/500 |

(Continued)

FOREIGN PATENT DOCUMENTS

| | | |
|---|---|---|
| JP | 2004-053758 A | 2/2004 |
| JP | 2008-281991 A | 11/2008 |

(Continued)

*Primary Examiner* — Sultan Chowdhury
(74) *Attorney, Agent, or Firm* — Oliff PLC

(57) ABSTRACT

A projection-type display apparatus synthesizes and emits light emitted from a plurality of liquid crystal devices with a projection optical system. Provided that a liquid crystal at an inner side of a seal material in the plurality of liquid crystal devices is V1 in volume and a liquid crystal in a display region is V2 in volume in the plurality of liquid crystal devices, in a second liquid crystal device (a liquid crystal device for blue light) on which light having a wavelength shorter than the wavelength of light being incident on a first liquid crystal device (a liquid crystal device for green light) is incident on the display region, a liquid crystal volume ratio V1/V2 is greater than that of the first liquid crystal device, among the plurality of liquid crystal devices.

14 Claims, 16 Drawing Sheets

(56) References Cited

U.S. PATENT DOCUMENTS

| | | |
|---|---|---|
| 2016/0131929 A1 | 5/2016 | Lee et al. |
| 2016/0284302 A1* | 9/2016 | Tomikawa ............ G09G 3/3655 |
| 2019/0086698 A1* | 3/2019 | Mizusaki ........... G02F 1/133528 |
| 2019/0190162 A1* | 6/2019 | Ohtake .................... H01Q 1/38 |
| 2019/0212589 A1* | 7/2019 | Waldern ............. G02B 27/4205 |

FOREIGN PATENT DOCUMENTS

| | | | |
|---|---|---|---|
| JP | 2009-031545 A | 2/2009 |
| JP | 2013-041130 A | 2/2013 |
| JP | 2016-095496 A | 5/2016 |

* cited by examiner

PROJECTION-TYPE DISPLAY APPARATUS

The present application is based on, and claims priority from JP Application Serial Number 2019-129993, filed Jul. 12, 2019, the disclosure of which is hereby incorporated by reference herein in its entirety.

BACKGROUND

1. Technical Field

The present disclosure relates to a projection-type display apparatus including a plurality of liquid crystal devices corresponding to light of each of colors.

2. Related Art

A projection-type display apparatus is provided with three liquid crystal devices corresponding to red light, green light, and blue light, respectively, where the three liquid crystal devices modulates red light, green light, and blue light, respectively, which are incident from a light illumination system. In the projection-type display apparatus, when a liquid crystal layer in a display region of a liquid crystal device is irradiated with light from a light source for a long period of time, a decomposition reaction or a polymerization reaction of a liquid crystal occurs to generate reaction products from the liquid crystal. When the reaction products aggregate within the pixel region, the modulation characteristics deteriorate in the region where the reaction products aggregate. Under such a circumstance, there is suggested a technology for trapping ionic reaction products with a trap electrode at the outer side of the pixel region.

Unfortunately, among the reaction products, it is difficult to trap non-ionic reaction products with the trap electrode at the outer side of the pixel region. Further, in a configuration for supplying surf signals having different phases to a plurality of trap electrodes provided at the outer side of the pixel region to sweep ionic reaction products to the outer side of the pixel region, a moving speed of the ionic reaction products is determined depending on the frequency of the surf signals, thus, an issue arises in that an appropriate sweep cannot be performed depending on the type of the ionic reaction products.

On the other hand, among the red light, green light, and blue light, a liquid crystal device for blue light, on which blue light having the shortest wavelength is incident, is easily degraded compared to a liquid crystal device for red light on which red light is incident and a liquid crystal device for green light on which green light is incident. Thus, there is suggested a technology in which the size of the liquid crystal device for blue light is made greater than the size of the liquid crystal device for red light and the size of the liquid crystal device for green light, to thus reduce the light convergence density of the illumination light (refer to JP 2009-31545 A).

Among the red light, green light, and blue light, the liquid crystal device for blue light, on which the blue light having the shortest wavelength is incident, has a tendency to easily cause a reaction generation to occur due to photochemical reaction compared to the liquid crystal device for red and the liquid crystal device for green, however, as in the technology described in JP 2009-31545 A, making the size of the liquid crystal device for blue light greater than the size of the liquid crystal device for red light and the size of the liquid crystal device for green light only leads to an enlargement of the irradiation region in the liquid crystal device for blue light. This makes it difficult to reduce the concentration of the reaction products within the liquid crystal in the display region. Therefore, an issue that needs to be addressed is that it is difficult for the technology in the related art to suppress the influence of the reaction products in the liquid crystal device on which light having a short wavelength is incident.

SUMMARY

In order to resolve the above-described issue, one aspect of a liquid crystal device according to the present disclosure includes a plurality of liquid crystal devices on which light having mutually different wavelengths is incident, and a projection optical system that synthesizes and emits light emitted from the plurality of liquid crystal devices, in which provided that a liquid crystal at an inner side of a seal material in the plurality of liquid crystal devices is V1 in volume and a liquid crystal in a display region is V2 in volume in the plurality of liquid crystal devices, a liquid crystal volume ratio V1/V2 of a second liquid crystal device on which light having a wavelength shorter than a wavelength of light being incident on a first liquid crystal device is incident is greater than a liquid crystal volume ratio V1/V2 of the first liquid crystal device, among the plurality of liquid crystal devices.

DESCRIPTION OF EXEMPLARY EMBODIMENTS

Figure 1:
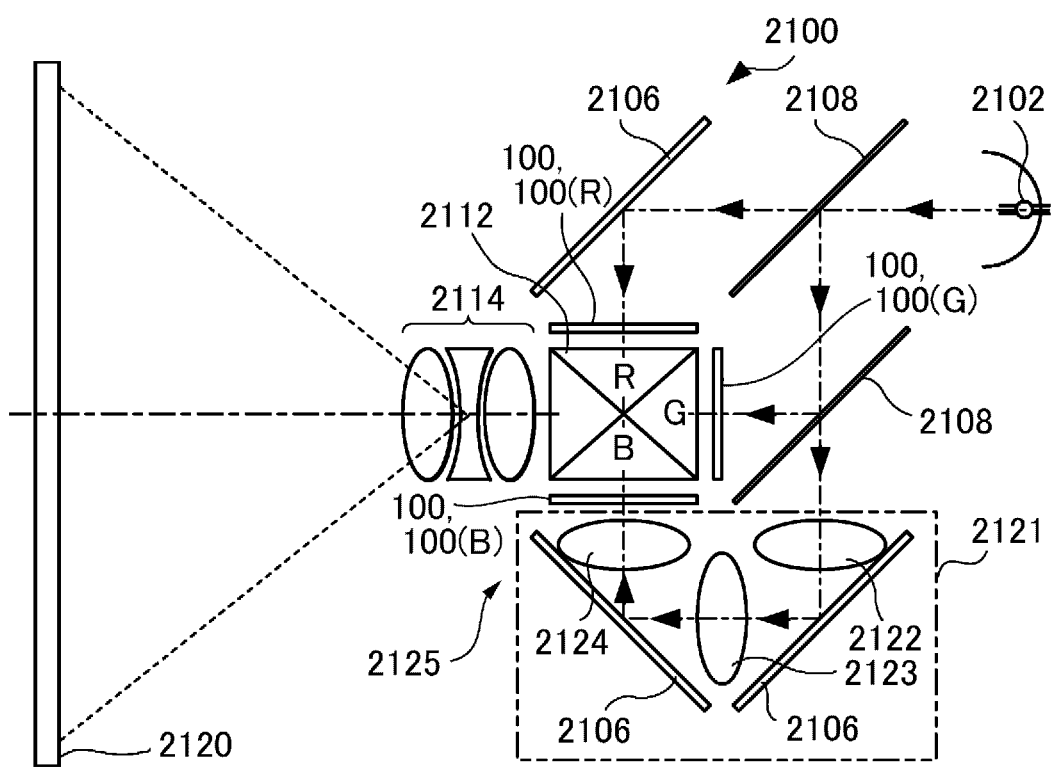
FIG. 1 is a schematic configuration view illustrating a projection-type display apparatus to which the present disclosure is applied.

Embodiments of the present disclosure will be described below with reference to the drawings. Note that, in each of the drawings be referred to in the following description, in order to illustrate each of the layers, each of the members, and the like in size to a degree recognizable in the drawings, each layer, each member, and the like are illustrated at different scales. Further, when describing a layer formed in a first substrate 10, an upper layer side or a surface side represents a side opposite to the side on which a substrate main body 10w of the first substrate 10 is located (the side on which a second substrate 20 and a liquid crystal layer 50 are located), and a lower layer side represents the side on which the substrate main body 10w of the first substrate 10 is located. When describing a layer formed in the second substrate 20, an upper layer side or a surface side represents a side opposite to the side on which a substrate main body 20w of the second substrate 20 is located (the side on which the first substrate 10 and the liquid crystal layer 50 are located), and a lower layer side represents the side on which the substrate main body 20w of the second substrate 20 is located. In addition, directions orthogonal to each other in the in-plane direction of the liquid crystal device will be described as a first direction and a second direction, respectively.

Embodiment 1

Configuration of Projection-Type Display Apparatus

FIG. 1 is a schematic configuration view illustrating a projection-type display apparatus 2100 to which the present disclosure is applied. Note that in FIG. 1, illustrations of a polarizing plate and a phase difference plate are omitted.

The projection-type display apparatus 2100 illustrated in FIG. 1 includes a plurality of liquid crystal devices 100 on which light having mutually different wavelengths are incident, and a projection optical system 2125 that synthesizes and emits light emitted from each of the plurality of liquid crystal devices 100, where the plurality of liquid crystal devices 100 are used as light valves. In the embodiment, the plurality of liquid crystal devices 100 include a liquid crystal device for red light 100(R) on which red light is incident, a liquid crystal device for green light 100(G) on which green light is incident, and a liquid crystal device for blue light 100(B) on which blue light is incident.

The projection-type display apparatus 2100 includes a lamp unit 2102 (a light source unit) including a white light source such as a halogen lamp, and illumination light emitted from the lamp unit 2102 is split, by three mirrors 2106 and two dichroic mirrors 2108, into light of three primary colors of red light (R), green light (G), and blue light (B). The split light is introduced into the liquid crystal device for red light 100(R), the liquid crystal device for green light 100(G), and the liquid crystal device for blue light 100(B), respectively, to be modulated. Note that the blue light (B), which passes through a long optical path compared to the red light (R) and green light (G), is introduced through a relay lens system 2121 including an incidence lens 2122, a relay lens 2123, and an emission lens 2124.

The light modulated by the liquid crystal device for red light 100(R), the liquid crystal device for green light 100(G), and the liquid crystal device for blue light 100(B) are synthesized by the projection optical system 2125 including a dichroic prism 2112 and a projection lens group 2114 to be emitted. More specifically, the red light (R) and blue light (B) of the light modulated by the liquid crystal device for red light 100(R), the liquid crystal device for green light 100(G), and the liquid crystal device for blue light 100(B) reflected at 90 degrees by the dichroic prism 2112 and the green light (G) passing through the dichroic prism 2112 are synthesized to be projected by the projection lens group 2114 onto a projected member such as a screen 2120 or the like.

Overall Configuration of Liquid Crystal Device 100

Figure 2:
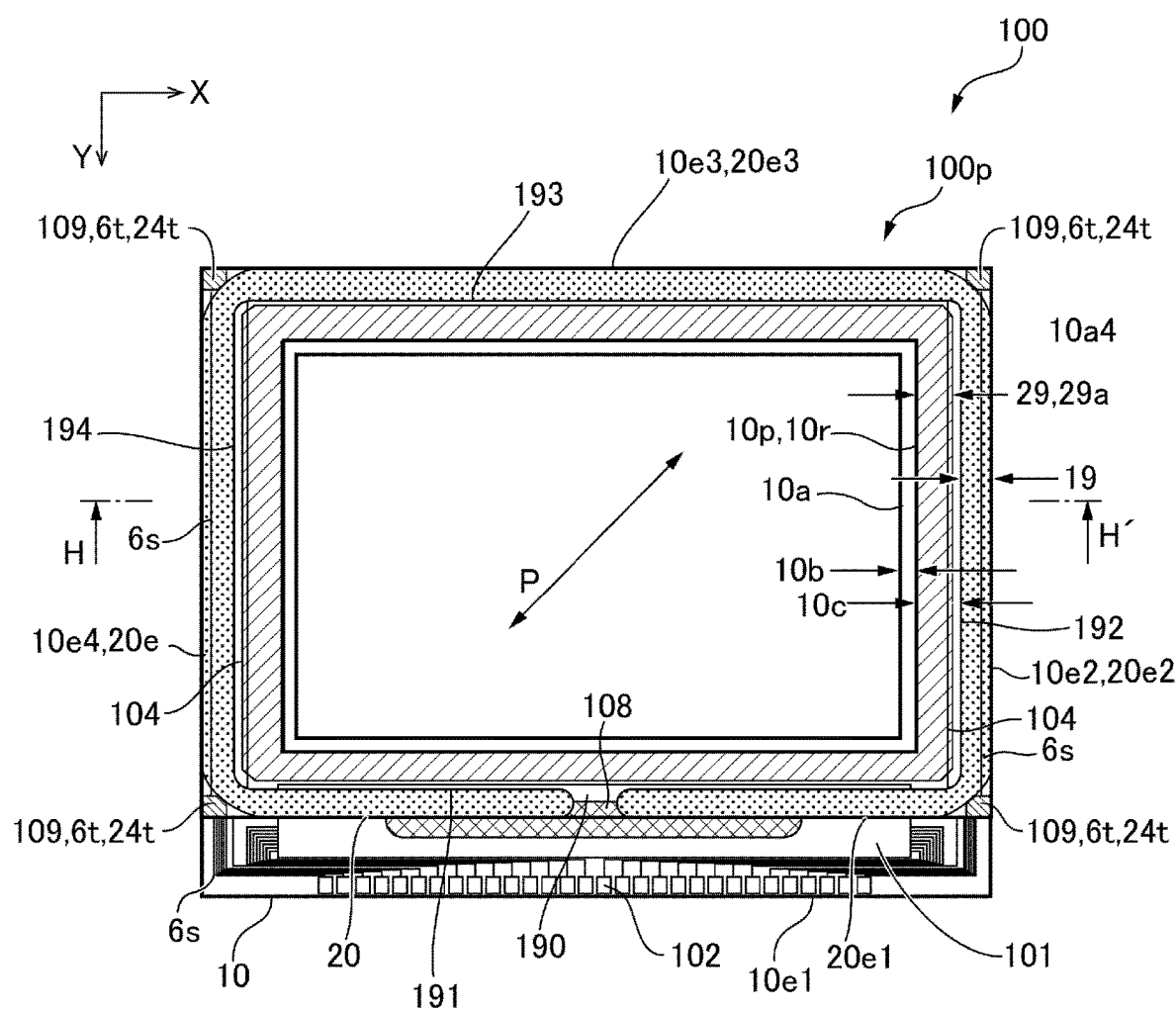
FIG. 2 is a plan view of a configuration example of a liquid crystal device illustrated in FIG. 1.
Figure 3:
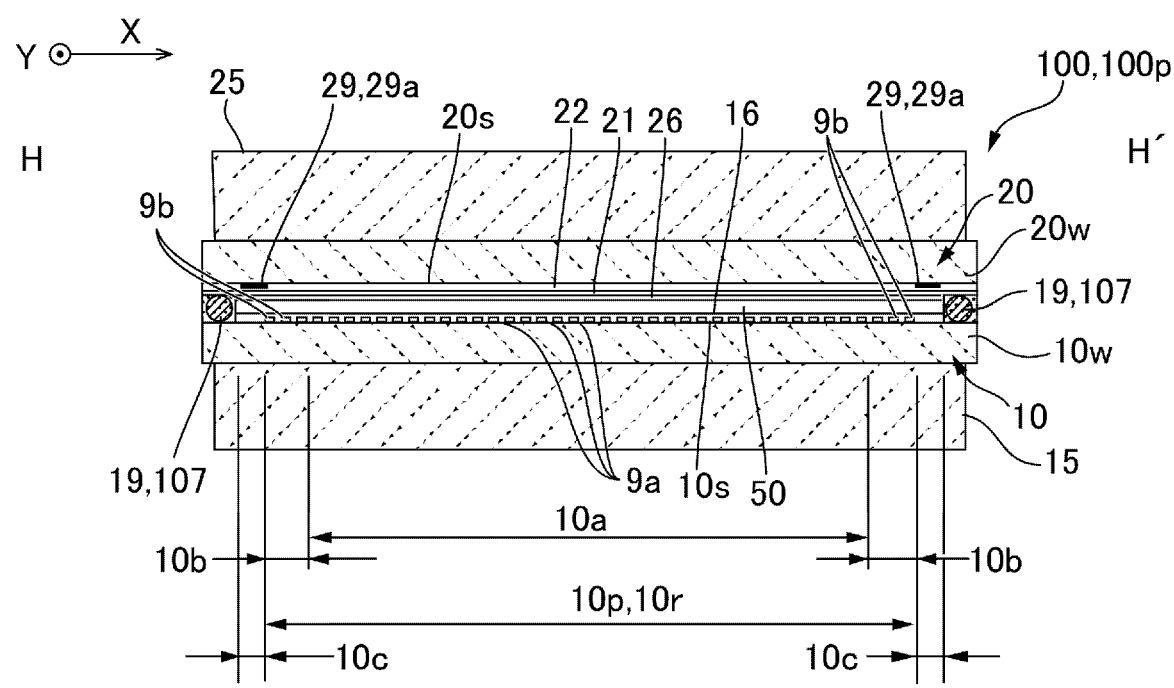
FIG. 3 is an H-H' cross-sectional view of a liquid crystal device illustrated in FIG. 2.

FIG. 2 is a plan view of a configuration example of the liquid crystal device 100 illustrated in FIG. 1. FIG. 3 is an H-H' cross-sectional view of the liquid crystal device 100 illustrated in FIG. 2. The liquid crystal device for red light 100(R), the liquid crystal device for green light 100(G), and the liquid crystal device for blue light 100(B) all have the same basic configuration, thus the basic configuration will be described as the liquid crystal device 100. As illustrated in FIGS. 2 and 3, the liquid crystal device 100 includes a liquid crystal panel 100p. In the liquid crystal device 100, a pair of substrates constituted by the first substrate 10 (element substrate) and the second substrate 20 (counter substrate) are bonded together via a predetermined gap by a seal material 19, where the seal material 19 is provided in a frame shape along an outer edge of the second substrate 20. The seal material 19 includes an adhesive containing a photo-curable resin, a thermosetting resin, or the like, in which gap materials 107 such as glass fibers or glass beads are mixed to set a distance between the two substrates to a predetermined value. In the liquid crystal device 100, the liquid crystal layer 50 is provided within a region surrounded by the seal material 19, the region being located between the first substrate 10 and the second substrate 20. In the seal material 19, a cut portion used as a liquid crystal injection port 190 is formed, where the liquid crystal injection port 190 is sealed by a sealant 108 after injecting a liquid crystal material. Note that when sealing using the liquid crystal material by a dropping method, the liquid crystal injection port 190 is not formed.

In the liquid crystal device 100, the first substrate 10 and the second substrate 20 each have a quadrangular shape, and at the inner side of the seal material 19, a pixel region 10r in which a plurality of pixels are arrayed is provided as a quadrangular region. The seal material 19 is provided in a square frame shape to surround the pixel region 10r, where a peripheral region 10c having a square frame shape is formed between the pixel region 10r and the seal material 19.

In Embodiment 1, the pixel region 10r is provided as a rectangular region having long sides extending in a first direction X. Further, the first substrate 10 and the second substrate 20, as in the pixel region 10r, also form a rectangle shape having long sides 10e1, 10e3, 20e1, and 20e3 extending in the first direction X, and short sides 10e2, 10e4, 20e2, and 20e4 extending in a second direction Y. In accordance with such shapes, the seal material 19 also has long sides 191 and 193 extending in the first direction X, and short sides 192 and 194 extending in the second direction Y.

On the side of the first substrate 10, which protrudes from the second substrate 20, a data line driving circuit 101 and a plurality of terminals 102 are formed along one side (the long side 10e1) of the first substrate 10, and along the other sides (the short sides 10e2 and 10e4) adjacent to the one side, a scanning-line driving circuit 104 is formed. The terminals 102 are provided at an outer peripheral side of the seal material 19. The terminals 102 are coupled with a flexible wiring substrate (not illustrated), where various potentials and various signals are input into the first substrate 10 via the flexible wiring substrate. In Embodiment 1, the data line driving circuit 101 and the scanning-line driving circuit 104 partially overlap in a plan view with the seal material 19.

The first substrate 10 includes the substrate main body 10w having translucency such as a quartz substrate and a glass substrate, where from the substrate main body 10w to a first alignment film 16 corresponds to the first substrate 10. On the side of one surface 10s of the first substrate 10 (the substrate main body 10w), which faces the second substrate 20, a plurality of switching elements and pixel electrodes 9a each electrically coupled to each of the plurality of switching elements are formed for each of the pixels in the pixel region 10r in a matrix pattern. The first alignment film 16 is formed on the upper layer side of the pixel electrodes 9a.

The second substrate 20 includes the substrate main body 20w having translucency such as a quartz substrate and a glass substrate, where from the substrate main body 20w to a second alignment film 26 corresponds to the second substrate 20. On the side of one surface 20s of the second substrate 20 (the substrate main body 20w), which faces the first substrate 10, a common electrode 21 is formed. The common electrode 21 is formed at substantially entire surface of the second substrate 20. On the side of the one surface 20s of the second substrate 20, a light-shielding member 29 is formed on the lower layer side of the common electrode 21, and the second alignment film 26 is overlaid at the surface on the side of the liquid crystal layer 50 of the common electrode 21. An insulating film 22 having translucency is formed between the light-shielding member 29 and the common electrode 21. The light-shielding member 29 is formed as a frame part 29a extending along an outer peripheral edge of the pixel region 10r, and a region on which illumination light is incident at the liquid crystal panel 100p is defined by the inner edge of the frame part 29a. Note that the second substrate 20 may be provided with a light-shielding layer of the same layer as the light-shielding member 29, as a black matrix portion (not illustrated) overlapping with an inter-pixel region interposed between the pixel electrodes 9a adjacent to each other. In addition, at the second substrate 20, a lens may be formed in a region that overlaps in a plan view with each of a plurality of the pixel electrodes 9a.

In the liquid crystal device 100, at the outer side of the seal material 19, inter-substrate conduction electrode portions 24t, which are formed of a part of the common electrode 21, are formed at the four corners on the side of the one surface 20s of the second substrate 20, and on the side of the one surface 10s of the first substrate 10, inter-substrate conduction electrode portions 6t are formed at the positions facing the four corners (the inter-substrate conduction electrode portions 24t) of the second substrate 20. The inter-substrate conduction electrode portions 6t have electrical continuity with a constant potential wiring line 6s to which a common potential Vcom is applied, and the constant potential wiring line 6s is conductively coupled to the terminal 102 for common potential among the plurality of terminals 102. Inter-substrate conduction materials 109 containing conductive particles are arranged between the inter-substrate conduction electrode portions 6t and the inter-substrate conduction electrode portions 24t, and the common electrode 21 of the second substrate 20 is electrically coupled to the side of the first substrate 10 via the inter-substrate conduction electrode portions 6t, the inter-substrate conduction materials 109, and the inter-substrate conduction electrode portions 24t. Accordingly, the common potential Vcom is applied to the common electrode 21 from the side of the first substrate 10.

The liquid crystal device 100 of Embodiment 1 serves as a transmission-type liquid crystal device. Thus, the pixel electrodes 9a and the common electrode 21 are formed of a light-transmissive conductive film, such as an indium tin oxide (ITO) film and an indium zinc oxide (IZO) film. In the liquid crystal device 100 of a transmission-type, light being incident from the side of the second substrate 20 is modulated while being emitted from the first substrate 10 to display an image, for example. Note that provided that the common electrode 21 is formed of a light-transmissive conductive film and the pixel electrode 9a is a reflective electrode, the liquid crystal device 100 is configured as a reflection-type liquid crystal device. In the liquid crystal device 100 of a reflection-type, light being incident from the side of the second substrate 20 is modulated while being reflected by the pixel electrode 9a of the first substrate 10 to be emitted from the second substrate 20 again, to display an image.

In the liquid crystal device 100 of the embodiment, a first dust-proof glass 15 is disposed to be layered on the surface on an opposite side from the second substrate 20 of the first substrate 10 and a second dust-proof glass 25 is disposed to be layered on the surface on an opposite side from the first substrate 10 of the second substrate 20. Accordingly, even when foreign substances such as dust adhere to the liquid crystal device 100, the foreign substances such as dust hardly adhere to the position close to the liquid crystal layer 50, such as the surface on an opposite side from the second substrate 20 of the first substrate 10 or the surface on an opposite side from the first substrate 10 of the second substrate 20. This makes it possible to suppress illumination light from focusing on the foreign material such as dust adhering to the liquid crystal device 100 to be displayed as an image.

In the embodiment, the region on which illumination light is incident at the liquid crystal panel 100p is defined by the light-shielding member 29 provided at the second substrate 20, and a light-shielding member may be provided at the second dust-proof glass 25, and a region on which illumination light is incident at the liquid crystal panel 100p may be defined by the light-shielding member provided at the second dust-proof glass 25.

Specific Configuration of Pixel 100a

Figure 4:
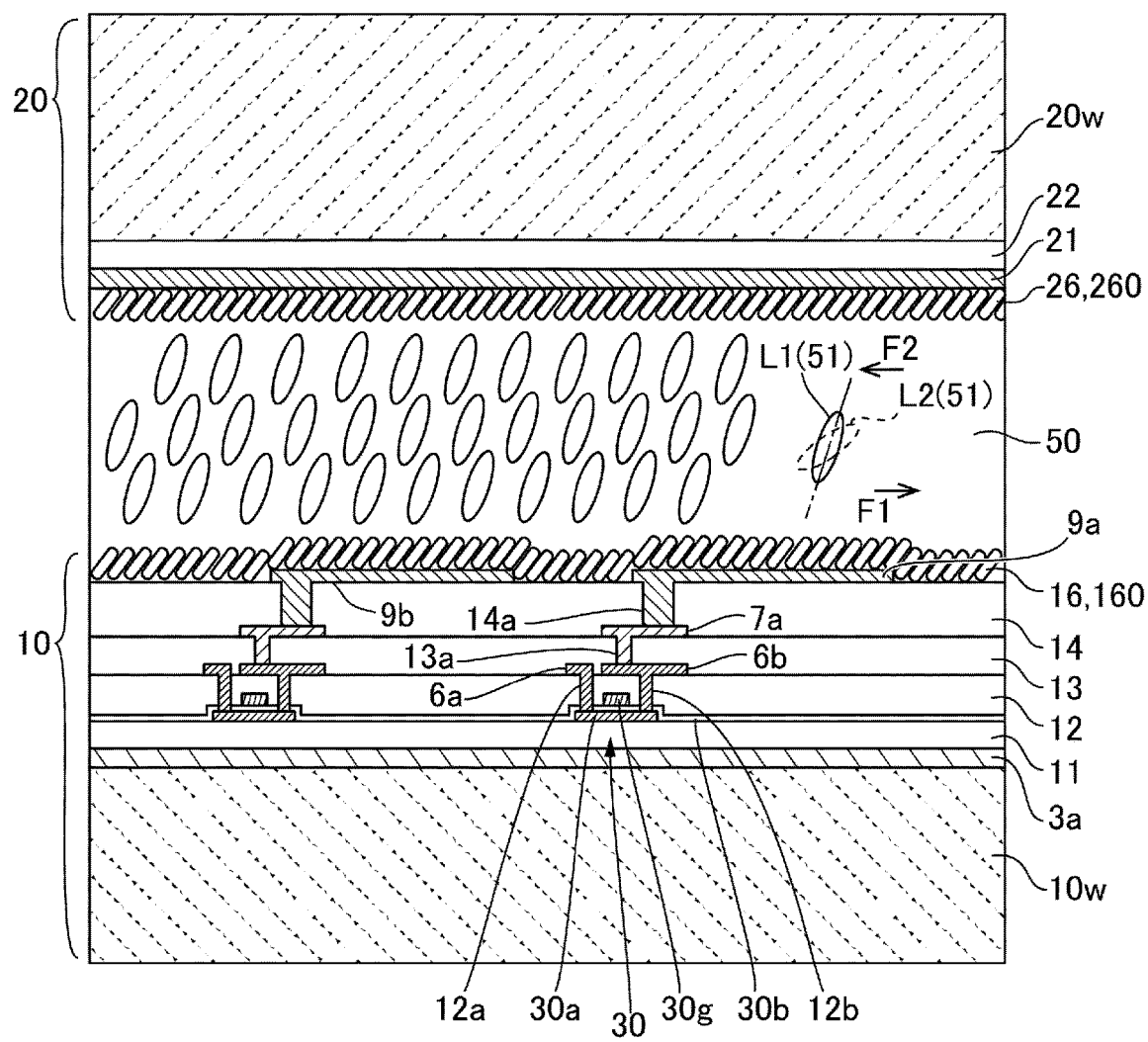
FIG. 4 is a cross-sectional view schematically illustrating a specific configuration example of pixels and the like of the liquid crystal device illustrated in FIG. 2.

FIG. 4 is a cross-sectional view schematically illustrating a specific configuration example of pixels and the like of the liquid crystal device 100 illustrated in FIG. 2. As illustrated in FIG. 4, a scanning line 3a, located on the lower layer side, including a conductive film such as a conductive polysilicon film, a metal silicide film, a metal film, or a metal compound film is formed on the side of the one surface 10s of the first substrate 10. In Embodiment 1, the scanning line 3a includes a light-shielding film of tungsten silicide (WSi) or the like. An insulating film 11 having translucency is formed on the upper layer side of the scanning line 3a, and a pixel switching element 30 including a semiconductor layer 30a is formed on the surface side of the insulating film 11 thus formed. In Embodiment 1, the insulating film 11 includes a silicon oxide film or the like.

The pixel switching element 30 includes the semiconductor layer 30a, and a gate electrode 30g intersecting the semiconductor layer 30a, and includes a gate insulating film 30b having translucency between the semiconductor layer 30a and the gate electrode 30g. The semiconductor layer 30a includes a polysilicon film (polycrystalline silicon film) or the like. The gate insulating film 30b has a two-layer structure including a gate insulating film composed of a silicon oxide film obtained by thermally oxidizing the semiconductor layer 30a, and a second gate insulating film composed of a silicon oxide film formed by a low pressure CVD method or the like. The gate electrode 30g is electrically coupled via a contact hole (not illustrated) passing through the gate insulating film 30b and the insulating film 11 to the scanning line 3a.

Interlayer insulating films 12, 13, and 14 having translucency and each including a silicon oxide film or the like are formed in this order on the upper layer side of the gate electrode 30g, and a holding capacitor (not illustrated) is constituted by utilizing spaces among the interlayer insulating films 12, 13, and 14, and the like. A data line 6a and a drain electrode 6b are formed between the interlayer insulating film 12 and the interlayer insulating film 13, and a relay electrode 7a is formed between the interlayer insulating film 13 and the interlayer insulating film 14. The data line 6a is electrically coupled to a source region of the semiconductor layer 30a via a contact hole 12a passing through the interlayer insulating film 12 and the gate insulating film 30b. The drain electrode 6b is electrically coupled to a drain region of the semiconductor layer 30a via a contact hole 12b passing through the interlayer insulating film 12 and the gate insulating film 30b. The relay electrode 7a is electrically coupled to the drain electrode 6b via a contact hole 13a passing through the interlayer insulating film 13. The interlayer insulating film 14 forms a flat surface, and the pixel electrode 9a is formed on the surface side of the interlayer insulating film 14 (the face side on the side of the liquid crystal layer 50). The pixel electrode 9a has electrical continuity with the relay electrode 7a via a contact hole 14a passing through the interlayer insulating film 14. Thus, the pixel electrode 9a is electrically coupled to a drain region of the pixel switching element 30 via the relay electrode 7a and the drain electrode 6b.

The first alignment film 16 and the second alignment film 26 are inorganic alignment films formed of obliquely deposited film of, for example, silicon oxide film ($SiO_x$ ($x \leq 2$)), titanium oxide film ($TiO_2$), magnesium oxide film (MgO), or aluminum oxide film ($Al_2O_3$ and the like). Thus, in the first alignment film 16 and the second alignment film 26, columnar structures 160 and 260 (column) are inclined obliquely from the normal direction with respect to the one surfaces 10s and 20s of the first substrate 10 and the second substrate 20. The alignment regulating force of the first alignment film 16 and the second alignment film 26 is anti-parallel. Thus, the first alignment film 16 and the second alignment film 26, as indicated by a solid line L1, cause a long axis of the nematic liquid crystal molecules (liquid crystal molecules 51), which have negative dielectric anisotropy used in the liquid crystal layer 50, to be aligned in an obliquely inclined manner with respect to the first substrate 10 and the second substrate 20, to thus cause the liquid crystal molecules 51 to be pre-tilted. Therefore, when driving the liquid crystal device 100, the liquid crystal molecules 51 switch, in the liquid crystal layer 50, the orientation of the liquid crystal molecules 51, as illustrated by the solid line L1 and a dotted line L2 in FIG. 4.

In Embodiment 1, the first alignment film 16 or the second alignment film 26 cause the liquid crystal molecules 51 to be aligned in a direction that forms an angle of 45 degrees or 135 degrees with respect to the four sides that define an outer edge of the pixel region 10r, as illustrated by an arrow P in FIG. 2, for example. Thus, the liquid crystal molecules 51 are aligned in the diagonal-angle directions formed by two diagonal angles among the four angles of the pixel regions 10r. In this way, the liquid crystal device 100 is configured as a liquid crystal device of a normally black vertical alignment (VA) mode. Note that among the liquid crystal molecules 51, the liquid crystal molecules 51 located near the first substrate 10 and the second substrate 20 are each in a state of being held by the first alignment film 16 or the second alignment film 26.

Configuration of Display Region 100a

In the liquid crystal device 100, the region of the liquid crystal panel 100p on which illumination light is incident forms a display region 10p that modulates and emits the illumination light, and is a region defined by an inner edge of the light-shielding member 29 (the frame part 29a). In the embodiment, the entirety of the pixel region 10r forms the display region 10p.

Here, the pixel electrodes 9a aligned along the outer edge of the pixel region 10r among the pixel electrodes 9a arrayed in the pixel region 10r are used as dummy pixel electrodes 9b. In the embodiment, the dummy pixel electrodes 9b are applied, regardless of the image to be displayed, with an alternating current potential to a degree of performing black display. Thus, the entire region of a dummy pixel region 10b, in which the dummy pixel electrodes 9b are arrayed, serves as an electronic demarcation portion that performs black display, and forms the demarcation together with the light-shielding member 29. In contrast, in a region 10a surrounded by the dummy pixel region 10b, any image corresponding to an image signal is generated.

Note that the light-shielding member 29 may be provided in a manner overlapping with the dummy pixel electrodes 9b, where in this case, the region 10a surrounded by the dummy pixel region 10b forms the display region 10p on which illumination light is incident. In contrast, the dummy pixel region 10b may not be provided, where in this case, the entirety of the pixel region 10r forms the display region 10p and any image corresponding to the image signal is generated.

Detailed Configuration of Projection-Type Display Apparatus 2100

Figure 5:
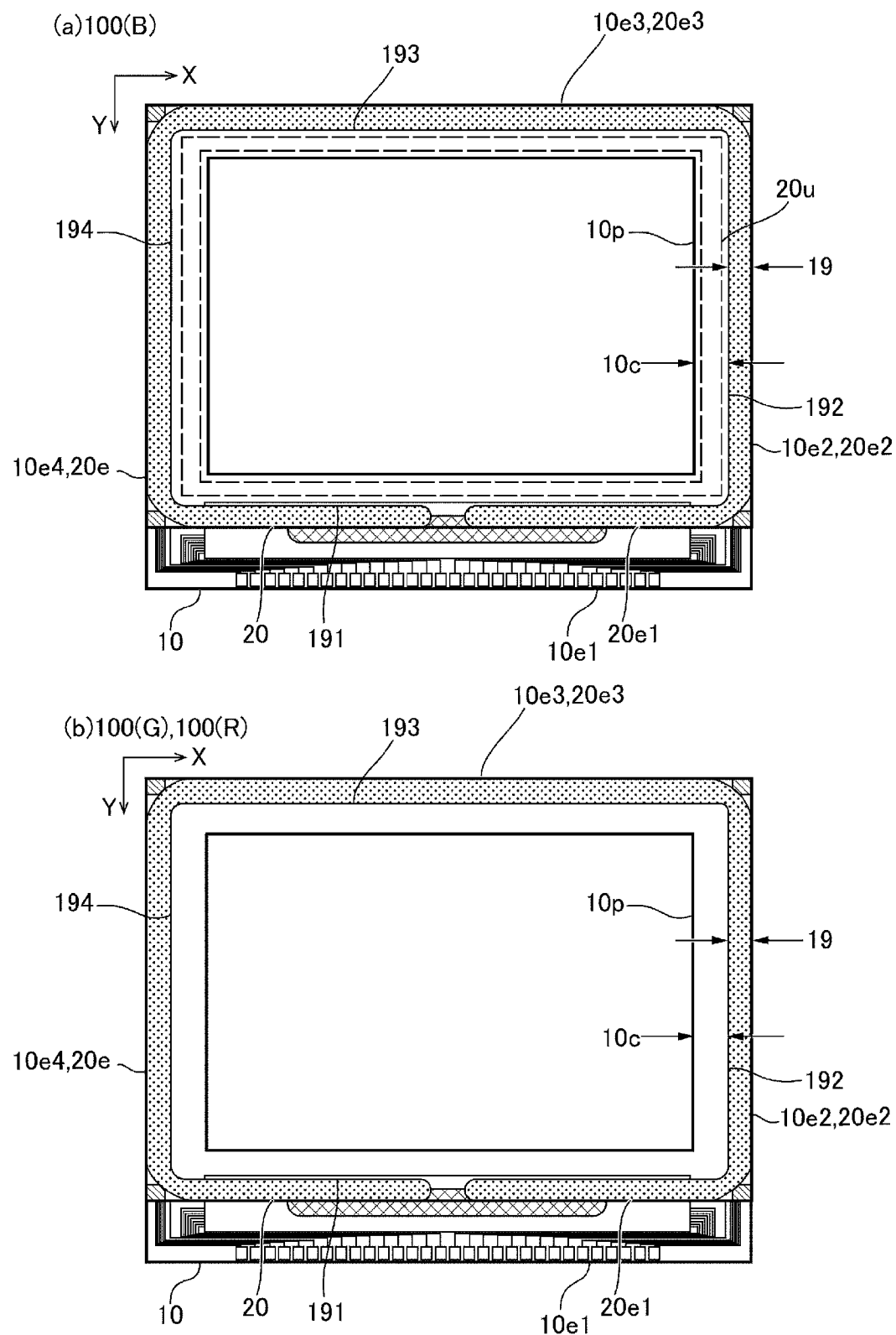
FIG. 5 is explanatory views of planar structures of three liquid crystal devices illustrated in FIG. 1.
Figure 6:
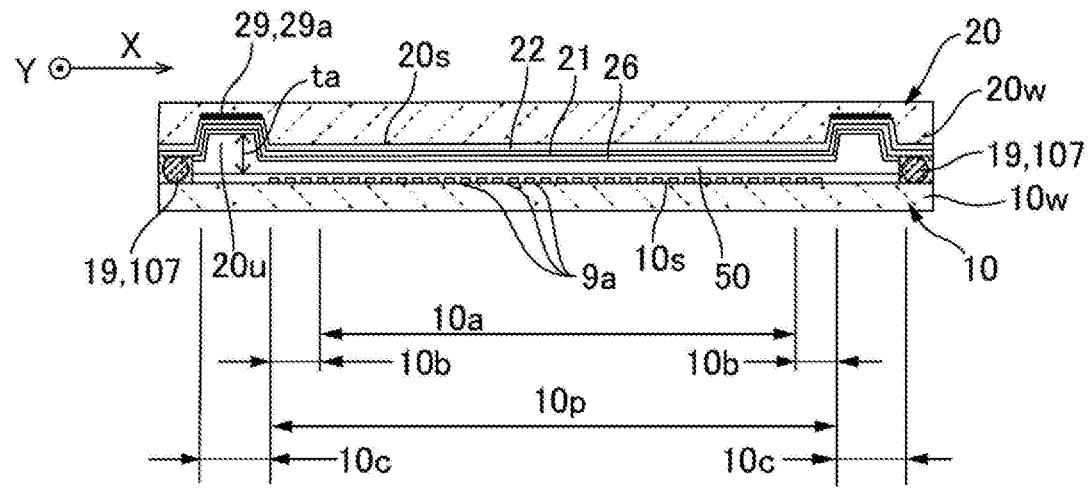
FIG. 6 is explanatory views of cross-sectional structures of three liquid crystal devices illustrated in FIG. 1.
Figure 6:
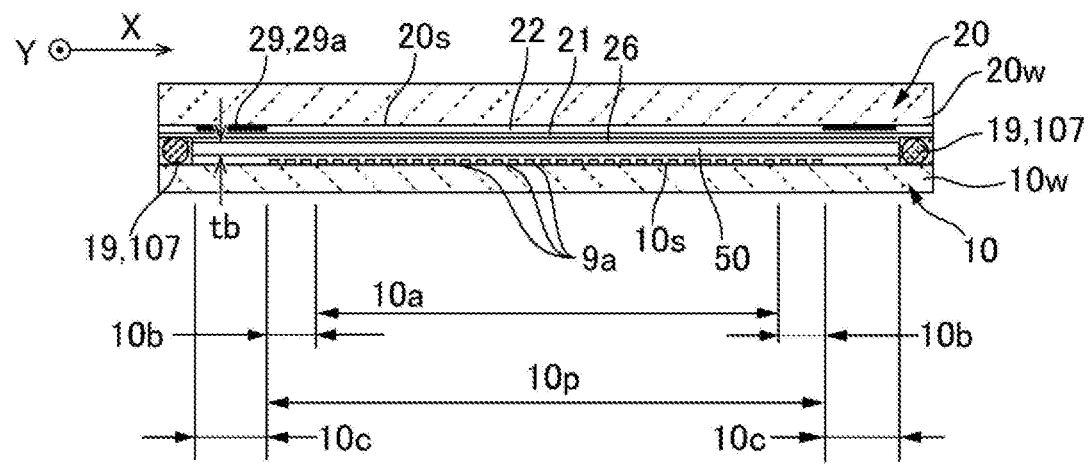

FIG. 5 is explanatory views of planar structures of three liquid crystal devices 100 illustrated in FIG. 1. FIG. 6 is explanatory views of cross-sectional structures of the three liquid crystal devices 100 illustrated in FIG. 1. In the projection-type display apparatus 2100 illustrated in FIG. 1, when the liquid crystal layer 50 in the display region 10p of the liquid crystal device 100 is irradiated with illumination light, a decomposition reaction or a polymerization reaction of the liquid crystal occurs to generate reaction products in the liquid crystal layer. Such reaction products aggregate within the display region 10p to reduce the modulation properties in the region where the reaction products aggregate. Here, among the red light (R), the green light (G), and the blue light (B), the reaction products due to photochemical reaction are easily generated in the liquid crystal device for blue light 100(B) on which the blue light (B) having the shortest wavelength is incident, compared to the liquid crystal device for red light 100(R) and the liquid crystal device for green light 100(G) In view of the above, a configuration described below is provided in the embodiment. In the following description, the "first liquid crystal device" in the present disclosure is the liquid crystal device for green light 100(G), the "second liquid crystal device" in the present disclosure is the liquid crystal device for blue light 100(B), and the "third liquid crystal device" is the liquid crystal device for red light 100(R).

In the embodiment, provided that the liquid crystal layer 50 at the inner side of the seal material 19 in the liquid crystal device 100 is V1 in volume and the liquid crystal in the display region 10p is V2 in volume, the liquid crystal volume ratio V1/V2 of the three liquid crystal devices 100 is set to an appropriate value. More specifically, as illustrated in FIGS. 5 and 6, in the embodiment, among the liquid crystal device for red light 100(R), the liquid crystal device for green light 100(G), and the liquid crystal device for blue light 100(B), the liquid crystal volume ratio V1/V2 of the second liquid crystal device (the liquid crystal device for blue light 100(B)) on which light having a shorter wavelength than the wavelength of light being incident on the first liquid crystal device (the liquid crystal device for green light 100(G)) is greater than the liquid crystal volume ratio V1/V2 of the first liquid crystal device (the liquid crystal device for green light 100(G)). Note that the liquid crystal volume ratio V1/V2 of the third liquid crystal device (the liquid crystal device for red light 100(R)) is equal to the liquid crystal volume ratio V1/V2 of the first liquid crystal device (the liquid crystal device for green light 100(G)).

In achieving such a configuration, in the embodiment, the liquid crystal device for blue light 100(B) has the same planar structure as the liquid crystal device for green light 100(G) and the liquid crystal device for red light 100(R), in which the outer shape sizes, the sizes of the display regions 10p, the spacing between the display regions 10p and the seal materials 19, and the like are equal to one another. In addition, in the liquid crystal device for blue light 100(B), the liquid crystal layer 50 in the display region 10p has a thickness that is equal to those of the liquid crystal device for green light 100(G) and the liquid crystal device for red light 100(R).

However, a thickness to of the liquid crystal layer 50 between the display region 10p and the seal material 19 of the liquid crystal device for blue light 100(B) is greater than a thickness tb of the liquid crystal layer 50 between the display region 10p and the seal material 19 of the liquid crystal device for green light 100(G) and the liquid crystal device for red light 100(R). More specifically, in the liquid crystal device for blue light 100(B), a concave portion 20u is formed, between the display region 10p and the seal material 19, in the substrate main body 20w of the second substrate 20, while in the liquid crystal device for green light 100(G) and the liquid crystal device for red light 100(R), no concave portion is formed between the display region 10p and the seal material 19. In the embodiment, the concave portion 20u extends in a manner surrounding the display region 10p.

Accordingly, the thickness to of the liquid crystal layer 50 between the display region 10p and the seal material 19 of the liquid crystal device for blue light 100(B) is greater than the thickness tb of the liquid crystal layer 50 between the display region 10p and the seal material 19 of the liquid crystal device for green light 100(G) and the liquid crystal device for red light 100(R). Thus, among the liquid crystal device for blue light 100(B), the liquid crystal device for green light 100(G), and the liquid crystal device for red light 100(R), the volumes V2 of the liquid crystals in the display regions 10p are equal to one another, however, the volume V1 of the liquid crystal at the inner side of the seal material 19 of the liquid crystal device for blue light 100(B) is greater than the volumes V1 of the liquid crystal at the inner side of the seal material 19 of the liquid crystal device for green light 100(G) and the liquid crystal device for red light 100(R). Therefore, the liquid crystal volume ratio V1/V2 of the liquid crystal device for blue light 100(B) is greater than the liquid crystal volume ratio V1/V2 of the liquid crystal device for green light 100(G) and the liquid crystal volume ratio V1/V2 of the liquid crystal device for red light 100(R).

Main Advantageous Effects of the Embodiment

In the projection-type display apparatus 2100 thus configured, when the liquid crystal layer 50 in the display region 10p of the liquid crystal device 100 is irradiated with illumination light, the reaction products due to photochemical reaction are easily generated in the liquid crystal device for blue light 100(B) on which the blue light (B) having the shortest wavelength is incident, compared to the liquid crystal device for red light 100(R) and the liquid crystal device for green light 100(G). In this case as well, as illustrated in FIG. 4, when the liquid crystal device 100 is driven, a flow occurs in the liquid crystal layer 50 by the orientation of the liquid crystal molecules 51 being switched, as indicated by the solid line L1 and the dotted line L2. Further, the difference in temperature when the temperature of the liquid crystal layer 50 rises due to the irradiation of the illumination light causes a flow to occur in the liquid crystal layer 50. In addition, in the liquid crystal layer 50, a diffusion of the reaction products occurs due to the difference in concentration of the reaction products. This allows the liquid crystal on the entire inner side of the seal material 19 to dilute the reaction products generated in the display region 10p. At that time, the liquid crystal volume ratio V1/V2 of the liquid crystal device for blue light 100(B) is greater than the liquid crystal volume ratio V1/V2 of the liquid crystal device for green light 100(G) and the liquid crystal volume ratio V1/V2 of the liquid crystal device for red light 100(R), thus the degree of dilution of the reaction products is large in the liquid crystal device for blue light 100(B). Thus, even when the reaction products are greatly generated in the liquid crystal device for blue light 100(B) compared to the liquid crystal device for red light 100(R) and the liquid crystal device for green light 100(G), an influence on the display due to the reaction products in the display region 10p can be suppressed to the same extent as the liquid crystal device for red light 100(R) and the liquid crystal device for green light 100(G). Therefore, the projection-type display apparatus 2100 can display a high-quality image for a long period of time.

In addition, in the embodiment, contrary to the configuration in which ionic reaction products are trapped at the outer side of the display region 10p with a trap electrode, an influence on the display due to the reaction products can be suppressed regardless of whether the reaction products are ionic or non-ionic.

Modified Example of Embodiment 1

In Embodiment 1, the concave portion 20u is employed which has a structure extending in a manner surrounding the display region 10p, however, an aspect in which the concave portion 20u extends only along the long sides 191 and 193 of the seal material 19, or an aspect in which the concave portion 20u extends only along the short sides 192 and 194 of the seal material 19 may be employed. In addition, when the concave portion 20u extends in a manner surrounding the display region 10p, an aspect in which the concave portion 20u is discontinuous between the long sides 191 and 193 and the short sides 192 and 194 may be employed. According to such an aspect, the common electrode 21 can be easily caused to continuously extend from the display region 10p to the electrical continuity position by the inter-substrate conduction material 109.

Further in Embodiment 1, the concave portion 20u is formed only in the liquid crystal device for blue light 100(B), however, the concave portion 20u may be formed in the liquid crystal device for blue light 100(B), the liquid crystal device for green light 100(G), and the liquid crystal device for red light 100(R). In this case, for the liquid crystal device for blue light 100(B), the concave portion 20u having a greater volume is to be formed compared to the liquid crystal device for red light 100(R) and the liquid crystal device for green light 100(G).

Embodiment 2

Figure 7:
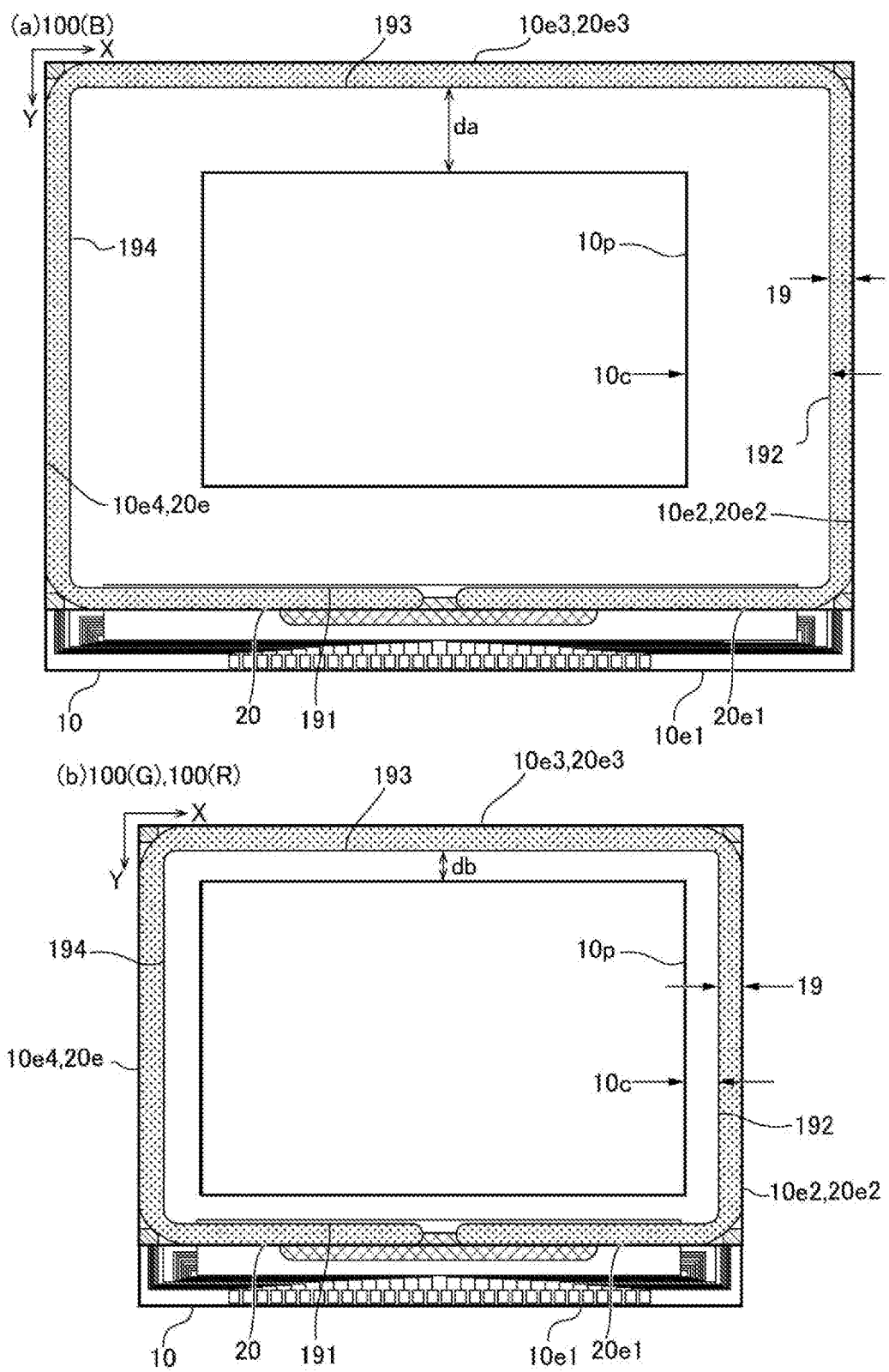
FIG. 7 is explanatory views of planar structures of three liquid crystal devices used in a projection-type display apparatus according to Embodiment 2 of the present disclosure.
Figure 8:
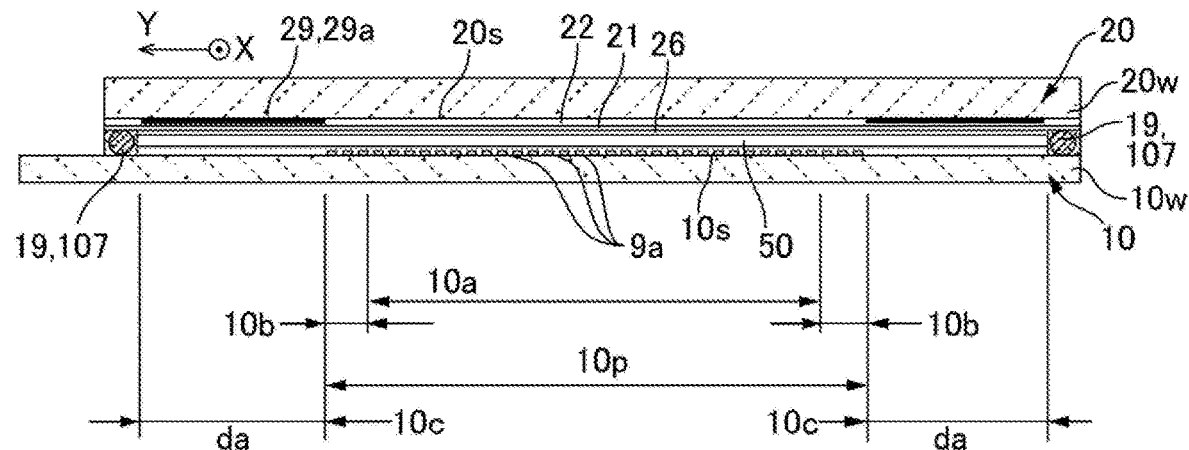
FIG. 8 is explanatory views of cross-sectional structures of three liquid crystal devices illustrated in FIG. 7.
Figure 8:
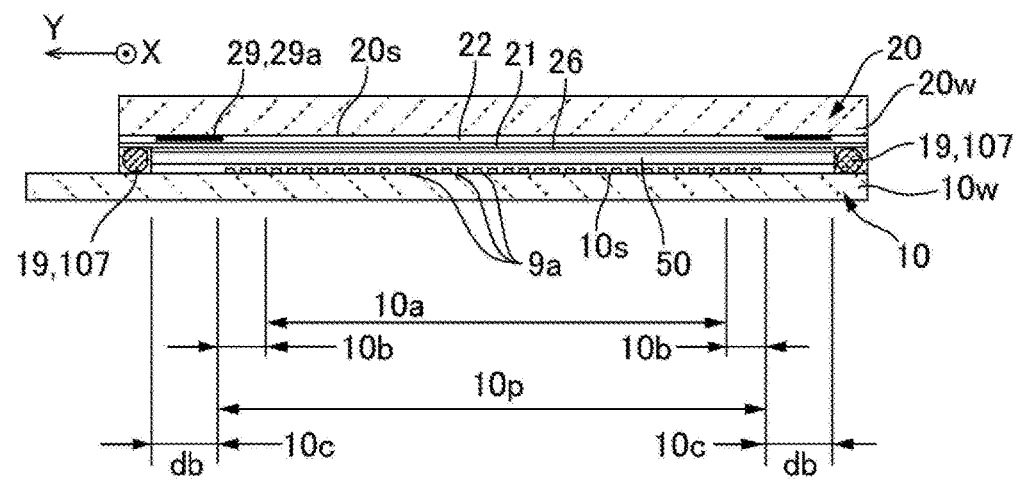

FIG. 7 is explanatory views of planar structures of the three liquid crystal devices 100 used in the projection-type display apparatus 2100 according to Embodiment 2 of the present disclosure. FIG. 8 is explanatory views of cross-sectional structures of the three liquid crystal devices 100 illustrated in FIG. 7. Note that the basic configurations of the embodiment and embodiments described below are the same as the configuration of Embodiment 1, and thus common parts are denoted by the same reference signs and description of the common portions will be omitted.

In the embodiment as well, as in Embodiment 1, among the three liquid crystal devices 100 used in the projection-type display apparatus 2100 illustrated in FIG. 1, the liquid crystal volume ratio V1/V2 of the second liquid crystal device (the liquid crystal device for blue light 100(B)) is greater than the liquid crystal volume ratio V1/V2 of the first liquid crystal device (the liquid crystal device for green light 100(G)) and the liquid crystal volume ratio V1/V2 of the third liquid crystal device (the liquid crystal device for red light 100(R)).

More specifically, as illustrated in FIGS. 7 and 8, a spacing da between the display region 10p and the seal material 19 of the liquid crystal device for blue light 100(B) is wider than a spacing db between the display region 10p and the seal material 19 of the liquid crystal device for green light 100(G), and a spacing db between the display region 10p and the seal material 19 of the liquid crystal device for red light 100(R). Thus, among the three liquid crystal devices 100, the volumes V2 of the liquid crystals in the display regions 10p are equal to one another, however, the volume V1 of the liquid crystal at the inner side of the seal material 19 of the liquid crystal device for blue light 100(B) is greater than the volumes V1 of the liquid crystal at the inner side of the seal material 19 of the liquid crystal device for green light 100(G) and the liquid crystal device for red light 100(R).

In achieving such a configuration, in the embodiment, the outer shape dimension of the liquid crystal device for blue light 100(B) is greater than the outer shape dimension of the liquid crystal device for green light 100(G) and the outer shape dimension of the liquid crystal device for red light 100(R). However, the liquid crystal device for blue light 100(B) has a size of the display region 10p and a thickness of the liquid crystal layer 50 in the display region 10p that are equal to those of the liquid crystal device for green light 100(G) and the liquid crystal device for red light 100(R).

As such, in the liquid crystal devices 100 of the projection-type display apparatus 2100 of the embodiment as well, as in Embodiment 1, even when the reaction products are greatly generated in the liquid crystal device for blue light 100(B) compared to the liquid crystal device for red light 100(R) and the liquid crystal device for green light 100(G), the same advantageous effects as in Embodiment 1 can be achieved such as that an influence on the display due to the reaction products in the display region 10p can be suppressed to the same extent as the liquid crystal device for red light 100(R) and the liquid crystal device for green light 100(G).

Embodiment 3

Figure 9:
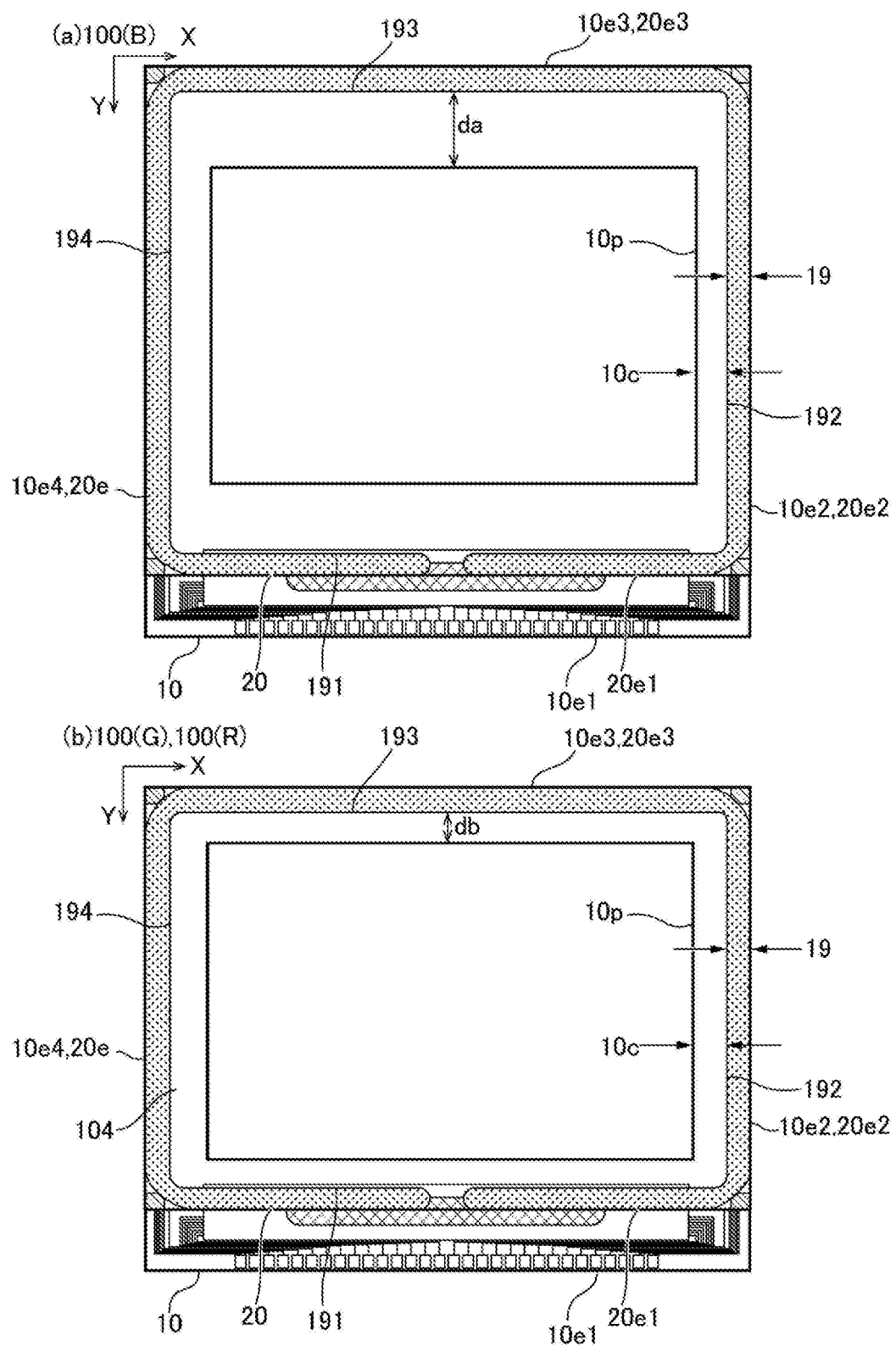
FIG. 9 is an explanatory view of a projection-type display apparatus according to Embodiment 3 of the present disclosure.

FIG. 9 is an explanatory view of the projection-type display apparatus 2100 according to Embodiment 3 of the present disclosure, and is explanatory views of planar structures of the three liquid crystal devices 100. In the embodiment as well, as in Embodiments 1 and 2, among the three liquid crystal devices 100 used in the projection-type display apparatus 2100 illustrated in FIG. 1, the liquid crystal volume ratio V1/V2 of the second liquid crystal device (the liquid crystal device for blue light 100(B)) is greater than the liquid crystal volume ratio V1/V2 of the first liquid crystal device (the liquid crystal device for green light 100(G)) and the liquid crystal volume ratio V1/V2 of the third liquid crystal device (the liquid crystal device for red light 100(R)).

Specifically, as illustrated in FIG. 9, the spacing da between the display region 10p and the seal material 19 in the second direction Y (the extending direction of the short sides 192 and 194) of the liquid crystal device for blue light 100(B) is wider than the spacing db between the display region 10p and the seal material 19 of the liquid crystal device for green light 100(G) and the liquid crystal device for red light 100(R). However, among the three liquid crystal devices 100, the spacing between the display regions 10p and the seal materials 19 in the first direction X (the extending direction of the long sides 191 and 193) are equal to one another.

More specifically, among the three liquid crystal devices 100, the sizes of the display regions 10p and the outer shape dimensions in the first direction X (the extending direction of the long sides 191 and 193) are equal to one another, however, the outer shape dimension in the second direction Y of the liquid crystal device for blue light 100(B) is greater than the outer shape dimension in the second direction Y (the extending direction of the short sides 192 and 194) of the liquid crystal device for green light 100(G). Thus, in the liquid crystal device for blue light 100(B), the liquid crystal device for green light 100(G), and the liquid crystal device for red light 100(R), the volumes V2 of the liquid crystals in the display regions 10p are equal to one another, however, the volume V1 of the liquid crystal at the inner side of the seal material 19 of the liquid crystal device for blue light 100(B) is greater than the volumes V1 of the liquid crystal at the inner side of the seal material 19 of the liquid crystal device for green light 100(G) and the liquid crystal device for red light 100(R).

As such, in the liquid crystal devices 100 of the projection-type display apparatus 2100 of the embodiment as well, as in Embodiment 1, even when the reaction products are greatly generated in the liquid crystal device for blue light 100(B) compared to the liquid crystal device for red light 100(R) and the liquid crystal device for green light 100(G), the same advantageous effects as in Embodiment 1 can be achieved such as that an influence on the display due to the reaction products in the display region 10p can be suppressed to the same extent as the liquid crystal device for red light 100(R) and the liquid crystal device for green light 100(G).

In addition, the outer shape dimension in the second direction Y of the liquid crystal device for blue light 100(B) is greater than the outer shape dimension in the second direction Y (the extending direction of the short sides 192 and 194) of the liquid crystal device for green light 100(G), however, the outer shape dimensions in the first direction X (the extending direction of the long sides 191 and 193) are equal to one another among the three liquid crystal devices 100. Accordingly, around the dichroic prism 2112 illustrated in FIG. 1, although there is no spatial margin in the first direction X of the liquid crystal device 100, there is a spatial margin in the second direction Y of the liquid crystal device 100, thus even when the outer shape dimension in the second direction Y of the liquid crystal device for blue light 100(B) is enlarged, the three liquid crystal devices 100 can be appropriately arranged around the dichroic prism 2112.

Embodiment 4

Figure 10:
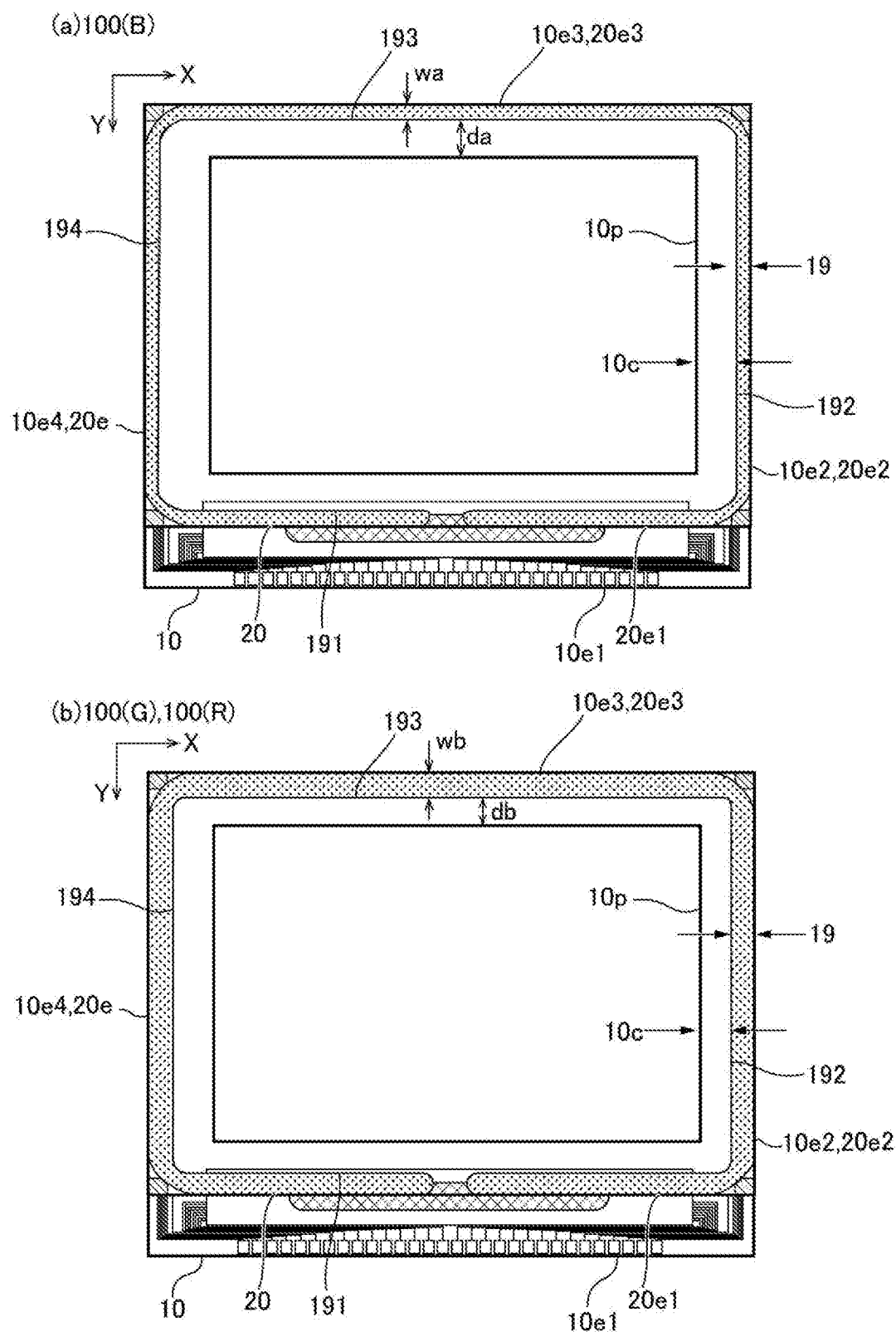
FIG. 10 is an explanatory view of a projection-type display apparatus according to Embodiment 4 of the present disclosure.

FIG. 10 is an explanatory view of a liquid crystal apparatus 100 according to Embodiment 4 of the present disclosure, and is explanatory views of planar structures of the three liquid crystal devices 100. In the embodiment as well, as in Embodiment 1, among the three liquid crystal devices 100 used in the projection-type display apparatus 2100 illustrated in FIG. 1, the liquid crystal volume ratio V1/V2 of the second liquid crystal device (the liquid crystal device for blue light 100(B)) is greater than the liquid crystal volume ratio V1/V2 of the first liquid crystal device (the liquid crystal device for green light 100(G)) and the liquid crystal volume ratio V1/V2 of the third liquid crystal device (the liquid crystal device for red light 100(R)).

Specifically, as illustrated in FIG. 9, a width wa of the seal material 19 of the liquid crystal device for blue light 100(B) is narrower than a width wb of the seal material 19 of the liquid crystal device for green light 100(G) and a width wb of the seal material 19 of the liquid crystal device for red light 100(R). However, among the three liquid crystal devices 100, the sizes and the outer shape dimensions of the display regions 10p are equal to one another. Accordingly, the spacing da between the display region 10p and the seal material 19 of the liquid crystal device for blue light 100(B) is wider than the spacing db between the display region 10p and the seal material 19 of the liquid crystal device for green light 100(G), and the spacing db between the display region 10p and the seal material 19 of the liquid crystal device for red light 100(R). Thus, among the liquid crystal device for blue light 100(B), the liquid crystal device for green light 100(G), and the liquid crystal device for red light 100(R), the volumes V2 of the liquid crystals in the display regions 10p are equal to one another, however, the volume V1 of the liquid crystal at the inner side of the seal material 19 of the liquid crystal device for blue light 100(B) is greater than the volumes V1 of the liquid crystal at the inner side of the seal material 19 of the liquid crystal device for green light 100(G) and the liquid crystal device for red light 100(R).

As such, in the liquid crystal devices 100 of the projection-type display apparatus 2100 of the embodiment as well, as in Embodiment 1, even when the reaction products are greatly generated in the liquid crystal device for blue light 100(B) compared to the liquid crystal device for red light 100(R) and the liquid crystal device for green light 100(G), the same advantageous effects as in Embodiment 1 can be achieved such as that an influence on the display due to the reaction products in the display region 10p can be suppressed to the same extent as the liquid crystal device for red light 100(R) and the liquid crystal device for green light 100(G).

Embodiment 5

Figure 11:
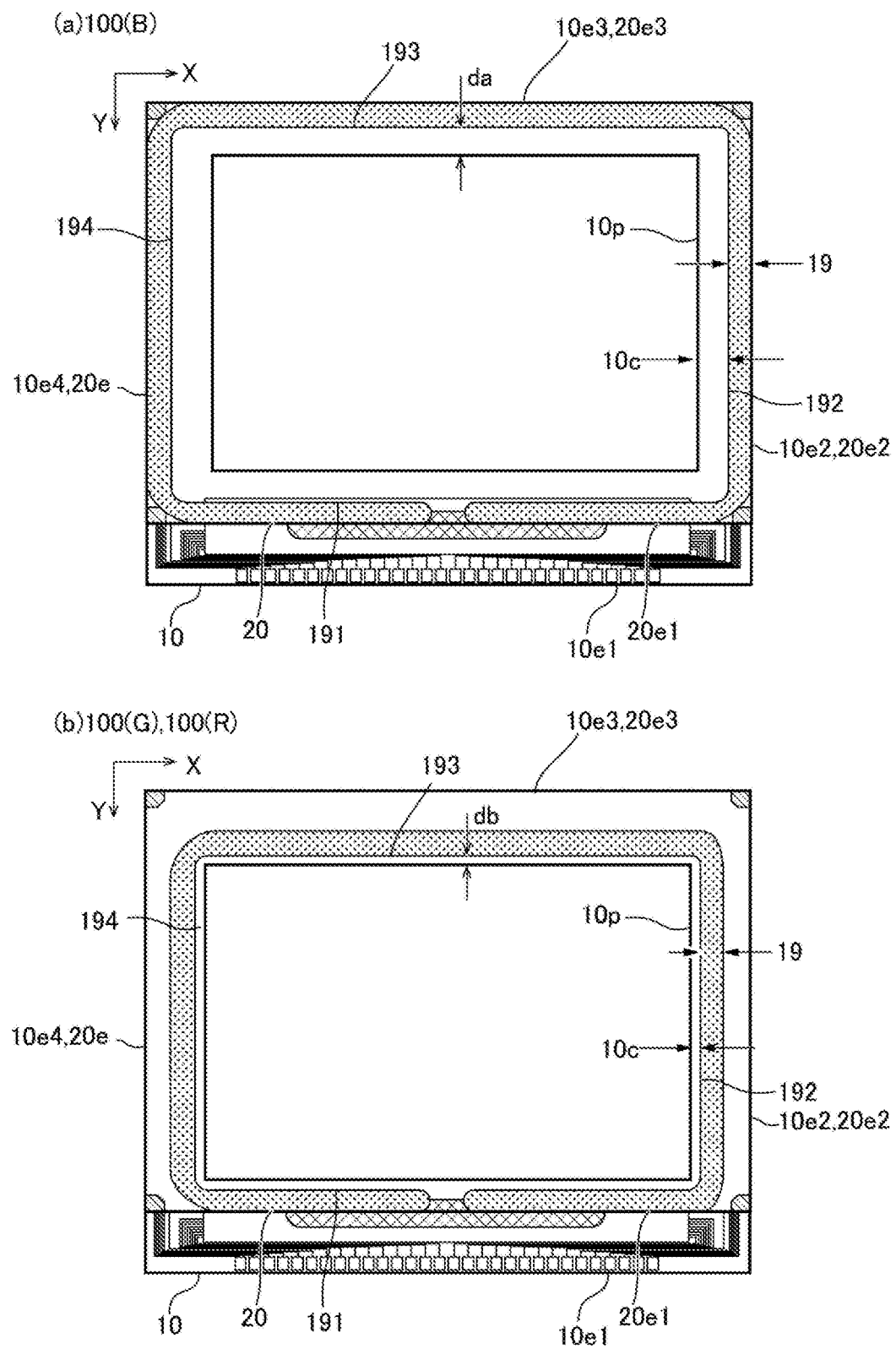
FIG. 11 is an explanatory view of a projection-type display apparatus according to Embodiment 5 of the present disclosure.

FIG. 11 is an explanatory view of the projection-type display apparatus 2100 according to Embodiment 5 of the present disclosure, and is explanatory views of planar structures of the three liquid crystal devices 100. In the embodiment as well, as in Embodiment 1, among the three liquid crystal devices 100 used in the projection-type display apparatus 2100 illustrated in FIG. 1, the liquid crystal volume ratio V1/V2 of the second liquid crystal device (the liquid crystal device for blue light 100(B)) is greater than the liquid crystal volume ratio V1/V2 of the first liquid crystal device (the liquid crystal device for green light 100(G)) and the liquid crystal volume ratio V1/V2 of the third liquid crystal device (the liquid crystal device for red light 100(R)).

Specifically, as illustrated in FIG. 9, in the liquid crystal device for blue light 100(B), the seal material 19 extends to come in contact with an edge of the second substrate 20, however, in the liquid crystal device for green light 100(G) and the liquid crystal device for red light 100(R), the long side 193 and the short sides 192 and 194 of the seal material 19 are spaced apart from an edge of the seal material 19. However, among the three liquid crystal devices 100, the sizes and the outer shape dimensions of the display regions 10p are equal to one another. Accordingly, the spacing da between the display region 10p and the seal material 19 of the liquid crystal device for blue light 100(B) is wider than the spacing db between the display region 10p and the seal material 19 of the liquid crystal device for green light 100(G) and the liquid crystal device for red light 100(R). Thus, among the liquid crystal device for blue light 100(B), the liquid crystal device for green light 100(G), and the liquid crystal device for red light 100(R), the volumes V2 of the liquid crystals in the display regions 10p are equal to one another, however, the volume V1 of the liquid crystal at the inner side of the seal material 19 of the liquid crystal device for blue light 100(B) is greater than the volumes V1 of the liquid crystal at the inner side of the seal material 19 of the liquid crystal device for green light 100(G) and the liquid crystal device for red light 100(R).

As such, in the liquid crystal devices 100 of the projection-type display apparatus 2100 of the embodiment as well, as in Embodiment 1, even when the reaction products are greatly generated in the liquid crystal device for blue light 100(B) compared to the liquid crystal device for red light 100(R) and the liquid crystal device for green light 100(G), the same advantageous effects as in Embodiment 1 can be achieved such as that an influence on the display due to the reaction products in the display region 10p can be suppressed to the same extent as the liquid crystal device for red light 100(R) and the liquid crystal device for green light 100(G).

Embodiment 6

Figure 12:
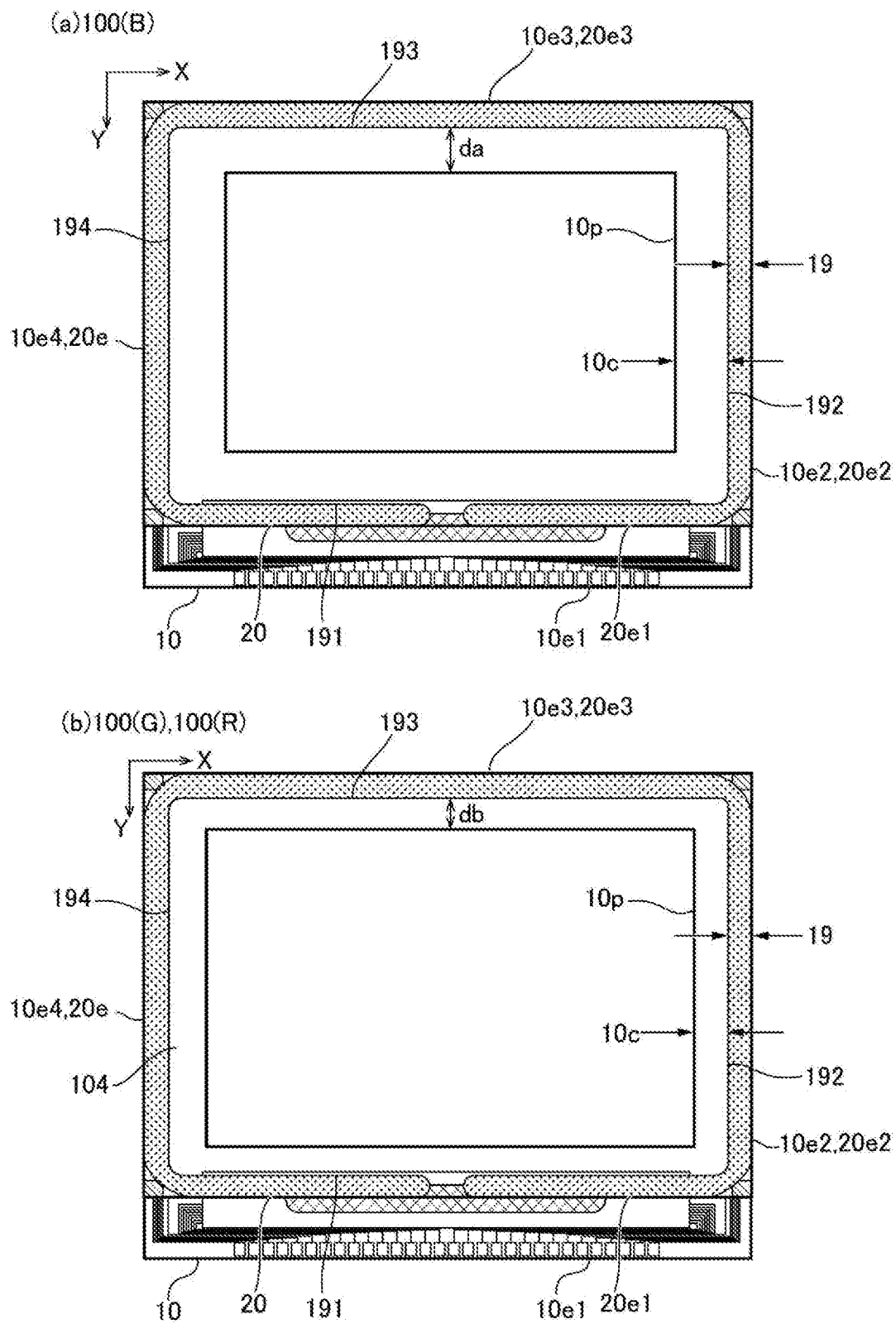
FIG. 12 is an explanatory view of a projection-type display apparatus according to Embodiment 6 of the present disclosure.

FIG. 12 is an explanatory views illustrating the projection-type display apparatus 2100 according to Embodiment 6 of the present disclosure, and are explanatory views of planar structures of the three liquid crystal devices 100. In the embodiment as well, as in Embodiment 1, among the three liquid crystal devices 100 used in the projection-type display apparatus 2100 illustrated in FIG. 1, the liquid crystal volume ratio V1/V2 of the second liquid crystal device (the liquid crystal device for blue light 100(B)) is greater than the liquid crystal volume ratio V1/V2 of the first liquid crystal device (the liquid crystal device for green light 100(G)) and the liquid crystal volume ratio V1/V2 of the third liquid crystal device (the liquid crystal device for red light 100(R)).

Specifically, as illustrated in FIG. 9, among the three liquid crystal devices 100, the outer shape dimensions are equal to one another, however, the display region 10p of the liquid crystal device for blue light 100(B) has a less area than the display region 10p of the liquid crystal device for green light 100(G) and the display region 10p of the liquid crystal device for red light 100(R). Accordingly, the spacing da between the display region 10p and the seal material 19 of the liquid crystal device for blue light 100(B) is wider than the spacing db between the display region 10p and the seal material 19 of the liquid crystal device for green light 100(G) and the liquid crystal device for red light 100(R). Thus, the volumes V1 of the liquid crystal at the inner side of the seal material 19 of the three liquid crystal devices 100 are equal to one another, however, the volume V2 of the liquid crystal in the display region 10p of the liquid crystal device for blue light 100(B) is less than the volumes V2 of the liquid crystal in the display region 10p of the liquid crystal device for green light 100(G) and the liquid crystal device for red light 100(R).

As such, in the liquid crystal devices 100 of the projection-type display apparatus 2100 of the embodiment as well, even when the reaction products are greatly generated in the liquid crystal device for blue light 100(B) compared to the liquid crystal device for red light 100(R) and the liquid crystal device for green light 100(G), the same advantageous effects as in Embodiment 1 can be achieved such as that an influence on the display due to the reaction products in the display region 10p can be suppressed to the same extent as the liquid crystal device for red light 100(R) and the liquid crystal device for green light 100(G).

Embodiment 7

Figure 13:
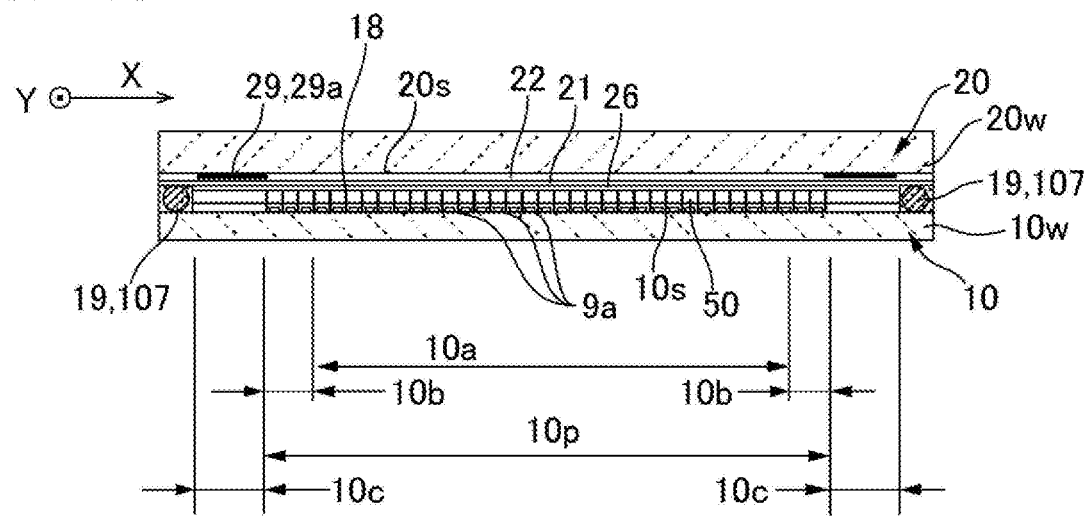
FIG. 13 is an explanatory view of a projection-type display apparatus according to Embodiment 7 of the present disclosure.
Figure 13:
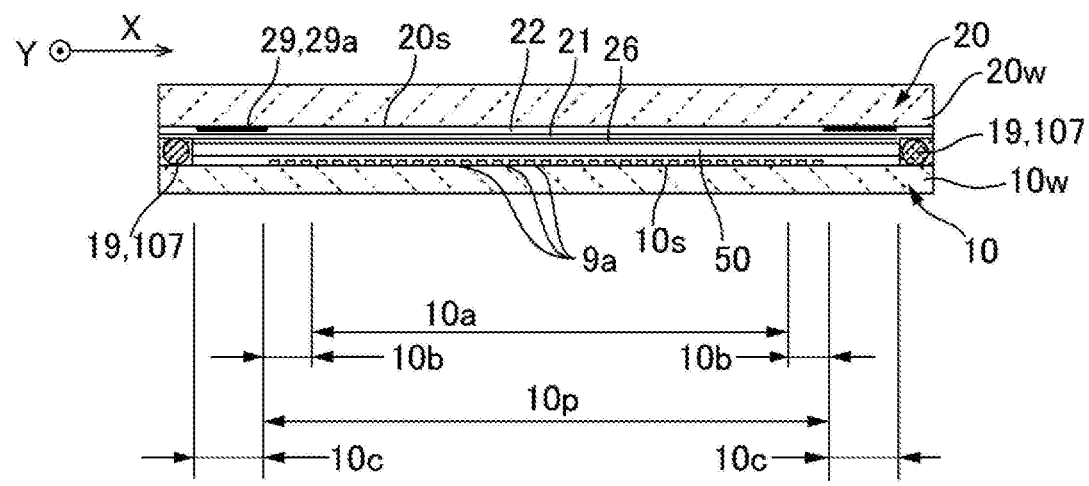

FIG. 13 is an explanatory view of the projection-type display apparatus 2100 according to Embodiment 7 of the present disclosure, and is explanatory views of cross-sectional structures of the three liquid crystal devices 100. In the embodiment as well, as in Embodiment 1, among the three liquid crystal devices 100 used in the projection-type display apparatus 2100 illustrated in FIG. 1, the liquid crystal volume ratio V1/V2 of the second liquid crystal device (the liquid crystal device for blue light 100(B)) is greater than the liquid crystal volume ratio V1/V2 of the first liquid crystal device (the liquid crystal device for green light 100(G)) and the liquid crystal volume ratio V1/V2 of the third liquid crystal device (the liquid crystal device for red light 100(R)).

Specifically, as illustrated in FIG. 13, a columnar spacer 18 for controlling a spacing between the first substrate 10 and the second substrate 20 is formed in the display region 10p of the liquid crystal device for blue light 100(B). The columnar spacer 18 thus formed, which is formed of an insulating material protruding toward the second substrate 20 at a position overlapping with a light-shielding part of a wiring line and the like in the first substrate 10, for example, is abutted against the second substrate 20 to control the spacing between the first substrate 10 and second substrate 20.

In contrast, the columnar spacer 18 is not formed in the display region 10p of the liquid crystal device for green light 100(G) and the display region 10p of the liquid crystal device for red light 100(R). Thus, the volume V2 of the liquid crystal in the display region 10p of the liquid crystal device for blue light 100(B) is less than the volumes V2 of the liquid crystals in the display regions 10p of the liquid crystal device for green light 100(G) and the liquid crystal device for red light 100(R). Note that the volume V2 of liquid crystal at the inner side of the seal material 19 of the liquid crystal device for blue light 100(B) is less than the volumes V2 of the liquid crystals at the inner side of the seal materials 19 of the liquid crystal device for green light 100(G) and the liquid crystal device for red light 100(R). In this case as well, the liquid crystal volume ratio V1/V2 of the liquid crystal device for blue light 100(B) is greater than the liquid crystal volume ratio V1/V2 of the liquid crystal device for green light 100(G) and the liquid crystal volume ratio V1/V2 of the third liquid crystal device (the liquid crystal device for red light 100(R)).

As such, in the liquid crystal devices 100 of the projection-type display apparatus 2100 of the embodiment as well, as in Embodiment 1, even when the reaction products are greatly generated in the liquid crystal device for blue light 100(B) compared to the liquid crystal device for red light 100(R) and the liquid crystal device for green light 100(G), the same advantageous effects as in Embodiment 1 can be achieved such as that an influence on the display due to the reaction products in the display region 10p can be suppressed to the same extent as the liquid crystal device for red light 100(R) and the liquid crystal device for green light 100(G).

Modified Example 1 of Embodiment 7

Figure 14:
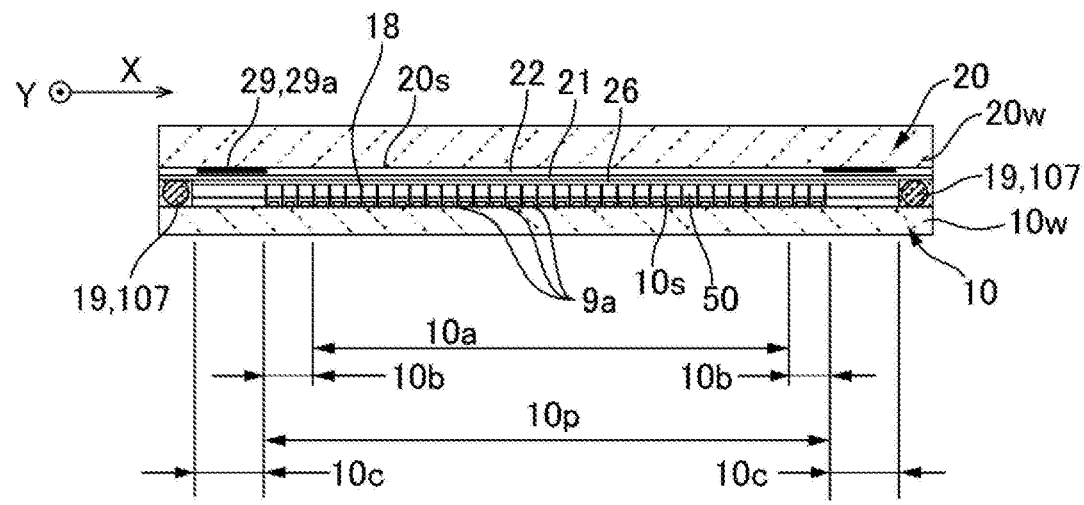
FIG. 14 is an explanatory view of a projection-type display apparatus according to Modified Example 1 of Embodiment 7 of the present disclosure.
Figure 14:
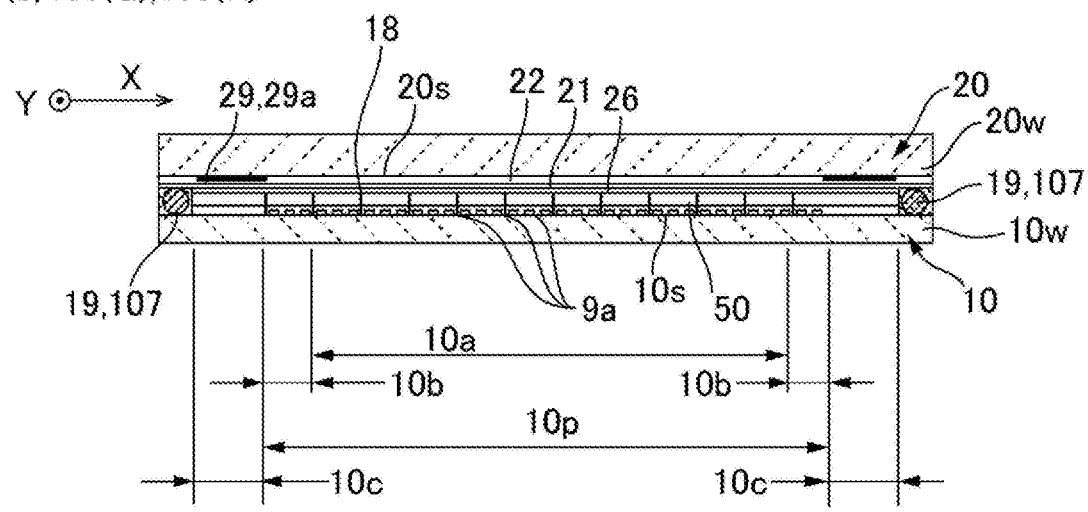

FIG. 14 is an explanatory view of the projection-type display apparatus 2100 according to Modified Example 1 of Embodiment 7 of the present disclosure, and is explanatory views of cross-sectional structures of the three liquid crystal devices 100. In the embodiment, as in Embodiment 7, the columnar spacer 18 for controlling the spacing between the first substrate 10 and the second substrate 20 is formed in the display region 10p of the liquid crystal device for blue light 100(B). In the embodiment, the columnar spacer 18 is also formed in the display region 10p of the liquid crystal device for green light 100(G) and the display region 10p of the liquid crystal device for red light 100(R), where in the display region 10p of the liquid crystal device for blue light 100(B), the arrangement density of the columnar spacer 18 is less than that of the display region 10p of the liquid crystal device for green light 100(G) and the liquid crystal device for red light 100(R). Thus, the liquid crystal volume ratio V1/V2 of the liquid crystal device for blue light 100(B) is greater than the liquid crystal volume ratio V1/V2 of the liquid crystal device for green light 100(G) and the liquid crystal volume ratio V1/V2 of the liquid crystal device for red light 100(R). Thus, as in Embodiment 7, even when the reaction products are greatly generated in the liquid crystal device for blue light 100(B) compared to the liquid crystal device for red light 100(R) and the liquid crystal device for green light 100(G), the same advantageous effects as in Embodiment 1 can be achieved such as that an influence on the display due to the reaction products in the display region 10p can be suppressed to the same extent as the liquid crystal device for red light 100(R) and the liquid crystal device for green light 100(G).

Modified Example 2 of Embodiment 7

Figure 15:
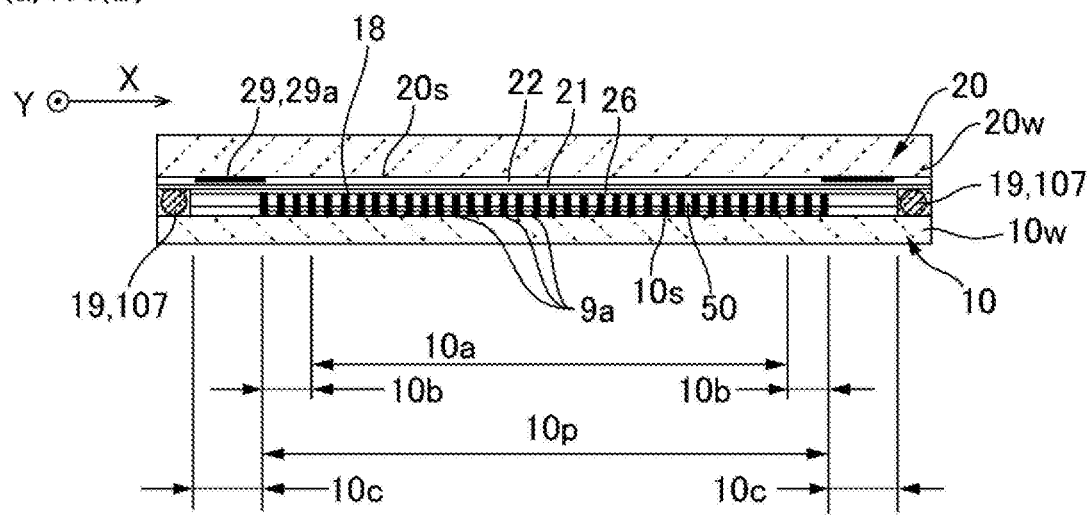
FIG. 15 is an explanatory view of a projection-type display apparatus according to Modified Example 2 of Embodiment 7 of the present disclosure.
Figure 15:
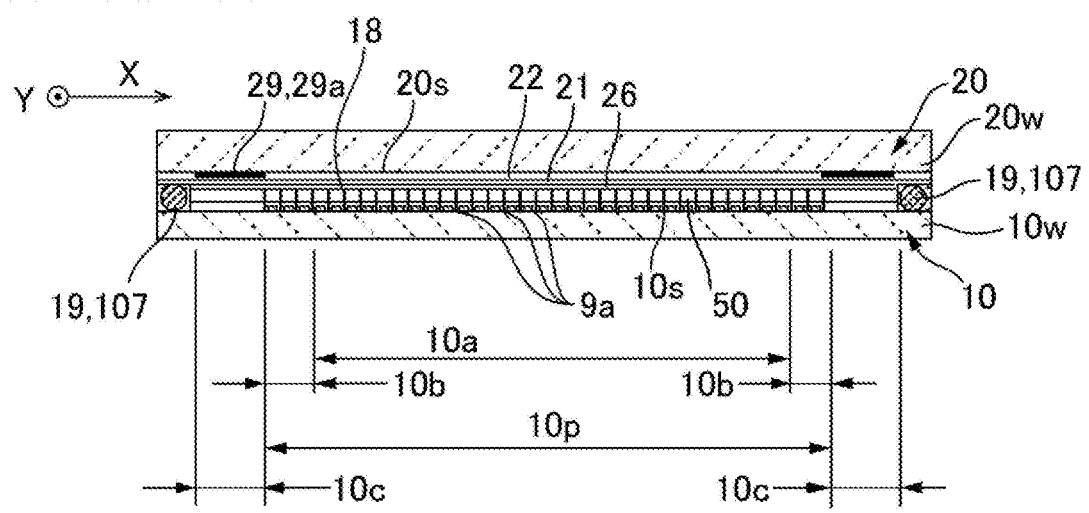

FIG. 15 is an explanatory view of the projection-type display apparatus 2100 according to Modified Example 2 of Embodiment 7 of the present disclosure, and is explanatory views of cross-sectional structures of the three liquid crystal devices 100. In the embodiment, as in Embodiment 7, the columnar spacer 18 for controlling the spacing between the first substrate 10 and the second substrate 20 is formed in the display region 10p of the liquid crystal device for blue light 100(B). In the embodiment, in the display region 10p of the liquid crystal device for green light 100(G) and the display region 10p of the liquid crystal device for red light 100(R) as well, the same number of the columnar spacers 18 per unit area, as in the display region 10p of the liquid crystal device for blue light 100(B), are formed. However, the columnar spacer 18 formed in the liquid crystal device for blue light 100(B) is thicker in diameter than the columnar spacer 18 formed in the liquid crystal device for blue light 100(B). Thus, the liquid crystal volume ratio V1/V2 of the liquid crystal device for blue light 100(B) is greater than the liquid crystal volume ratio V1/V2 of the liquid crystal device for green light 100(G) and the liquid crystal volume ratio V1/V2 of the liquid crystal device for red light 100(R). Thus, as in Embodiment 7, even when the reaction products are greatly generated in the liquid crystal device for blue light 100(B) compared to the liquid crystal device for red light 100(R) and the liquid crystal device for green light 100(G), the same advantageous effects as in Embodiment 1 can be achieved such as that an influence on the display due to the reaction products in the display region 10p can be suppressed to the same extent as the liquid crystal device for red light 100(R) and the liquid crystal device for green light 100(G).

Embodiment 8

Figure 16:
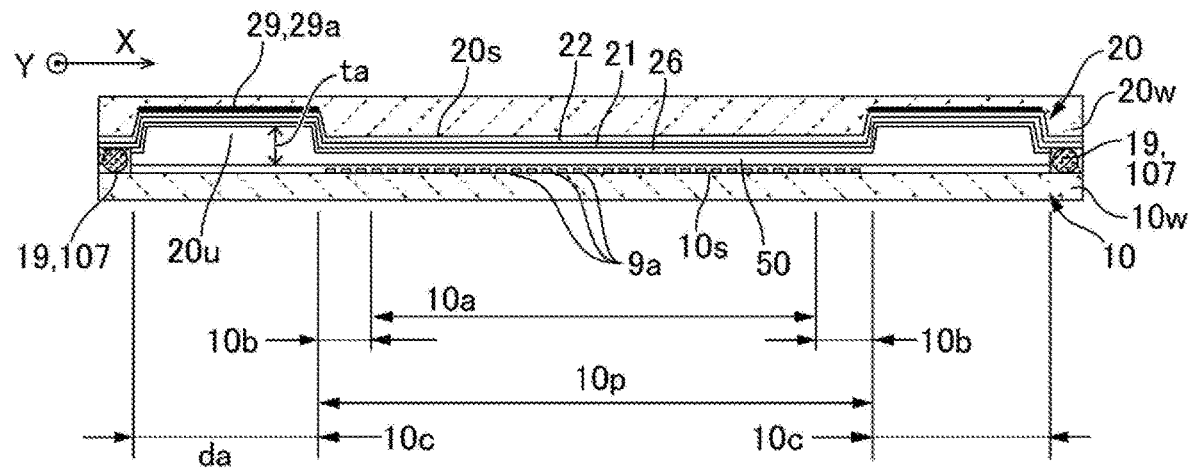
FIG. 16 is an explanatory view of a projection-type display apparatus according to Embodiment 8 of the present disclosure.
Figure 16:
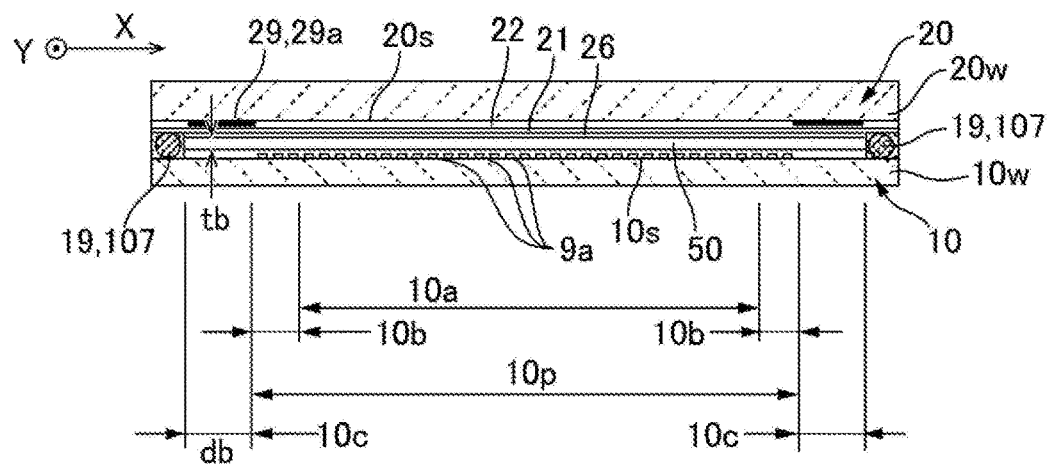

FIG. 16 is an explanatory view of the projection-type display apparatus 2100 according to Embodiment 8 of the present disclosure, and is explanatory views of cross-sectional structures of the three liquid crystal devices 100. By combining the features of the above-described embodiments, the liquid crystal volume ratio V1/V2 of the second liquid crystal device (the liquid crystal device for blue light 100(B)) may be caused to be greater than the liquid crystal volume ratio V1/V2 of the first liquid crystal device (the liquid crystal device for green light 100(G)) and the liquid crystal volume ratio V1/V2 of the third liquid crystal device (the liquid crystal device for red light 100(R)).

For example, in the embodiment, as illustrated in FIG. 16, as in Embodiment 1, the thickness to of the liquid crystal layer 50 between the display region 10p and the seal material 19 of the liquid crystal device for blue light 100(B) is greater than the thickness tb of the liquid crystal layer 50 between the display region 10p and the seal material 19 of the liquid crystal device for green light 100(G) and the liquid crystal device for red light 100(R). More specifically, in the liquid crystal device for blue light 100(B), the concave portion 20u is formed, between the display region 10p and the seal material 19, in the second substrate 20, while in the liquid crystal device for green light 100(G) and the liquid crystal device for red light 100(R), no concave portion is formed between the display region 10p and the seal material 19.

In addition, the spacing da between the display region 10p and the seal material 19 of the liquid crystal device for blue light 100(B) is wider than the spacing db between the display region 10p and the seal material 19 of the liquid crystal device for green light 100(G), and the spacing db between the display region 10p and the seal material 19 of the liquid crystal device for red light 100(R).

Thus, among the liquid crystal device for blue light 100(B), the liquid crystal device for green light 100(G), and the liquid crystal device for red light 100(R), the volumes V2 of the liquid crystals in the display regions 10p are equal to one another, however, the volume V1 of the liquid crystal at the inner side of the seal material 19 of the liquid crystal device for blue light 100(B) is greater than the volumes V1 of the liquid crystal at the inner side of the seal material 19 of the liquid crystal device for green light 100(G) and the liquid crystal device for red light 100(R). Therefore, the liquid crystal volume ratio V1/V2 of the liquid crystal device for blue light 100(B) is greater than the liquid crystal volume ratio V1/V2 of the liquid crystal device for green light 100(G) and the liquid crystal volume ratio V1/V2 of the liquid crystal device for red light 100(R). Thus, as in Embodiments 1 and 2, even when the reaction products are greatly generated in the liquid crystal device for blue light 100(B) compared to the liquid crystal device for red light 100(R) and the liquid crystal device for green light 100(G), the same advantageous effects as in Embodiment 1 can be achieved such as that an influence on the display due to the reaction products in the display region 10p can be suppressed to the same extent as the liquid crystal device for red light 100(R) and the liquid crystal device for green light 100(G).

OTHER EMBODIMENTS

In the above-described embodiments, the liquid crystal device for blue light 100(B) is referred to as "second liquid crystal device", and the liquid crystal device for green light 100(G) is referred to as "first liquid crystal device", thus the liquid crystal volume ratio V1/V2 has the relationship below. $100(B) > 100(G) \geq 100(R)$ However, the liquid crystal device for blue light 100(B) may be referred to as "second liquid crystal device", and the liquid crystal device for red light 100(R) may be referred to as "first liquid crystal device", where in this case, the liquid crystal volume ratio V1/V2 has any one of the relationships below.

$$100(B) \geq 100(G) > 100(R)$$

$$100(B) > 100(G) \geq 100(R)$$

In the above-described embodiments, although the present disclosure is applied to the liquid crystal device 100 of a transmission-type, the present disclosure may also be applied to the liquid crystal device 100 of a reflection-type.

What is claimed is:

1. A projection-type display apparatus comprising:
   a plurality of liquid crystal devices on which light having mutually different wavelengths is incident; and
   a projection optical system that synthesizes and emits light emitted from the plurality of liquid crystal devices, wherein
   provided that a liquid crystal at an inner side of a seal material in the plurality of liquid crystal devices is V1 in volume and a liquid crystal in a display region is V2 in volume in the plurality of liquid crystal devices,
   a liquid crystal volume ratio V1/V2 of a second liquid crystal device on which light having a wavelength shorter than a wavelength of light being incident on a first liquid crystal device is incident is greater than a liquid crystal volume ratio V1/V2 of the first liquid crystal device, among the plurality of liquid crystal devices.

2. The projection-type display apparatus according to claim 1, wherein
the plurality of liquid crystal devices each include a light-shielding member for partitioning the display region.

3. The projection-type display apparatus according to claim 1, wherein
the plurality of liquid crystal devices each include a liquid crystal layer having an equal thickness.

4. The projection-type display apparatus according to claim 1, wherein
a thickness of a liquid crystal layer between the display region and the seal material of the second liquid crystal device is greater than a thickness of a liquid crystal layer between the display region and the seal material of the first liquid crystal device.

5. The projection-type display apparatus according to claim 1, wherein
a spacing between the display region and the seal material of the second liquid crystal device is greater than a spacing between the seal material and the display region of the first liquid crystal device.

6. The projection-type display apparatus according to claim 5, wherein
an outer shape dimension of the second liquid crystal device is greater than an outer shape dimension of the first liquid crystal device.

7. The projection-type display apparatus according to claim 1, wherein
the plurality of liquid crystal devices each include a first side that extends along a first direction, and a second side that extends along a second direction that intersects the first direction and is shorter than the first side, wherein
a spacing between the display region and the seal material in the second direction of the second liquid crystal device is wider than a spacing between the display region and the seal material in the second direction of the first liquid crystal device.

8. The projection-type display apparatus according to claim 7, wherein
an outer shape dimension in the second direction of the second liquid crystal device is greater than an outer shape dimension in the second direction of the first liquid crystal device.

9. The projection-type display apparatus according to claim 5, wherein
the seal material of the first liquid crystal device has a width narrower than a width of the seal material of the second liquid crystal device.

10. The projection-type display apparatus according to claim 5, wherein
the display region of the second liquid crystal device has an area smaller than an area of the display region of the first liquid crystal device.

11. The projection-type display apparatus according to claim 1, wherein
the display region of the second liquid crystal device is provided with a columnar spacer, and the display region of the first liquid crystal device is provided with no columnar spacer.

12. The projection-type display apparatus according to claim 1, wherein
the display region of the first liquid crystal device and the display region of the second liquid crystal device are provided with a columnar spacer, and
an arrangement density of the columnar spacer in the second liquid crystal device is greater than an arrangement density of the columnar spacer in the first liquid crystal device.

13. The projection-type display apparatus according to claim 1, wherein
the display region of the second liquid crystal device and the display region of the first liquid crystal device are provided with a columnar spacer, and a columnar spacer in the second liquid crystal device is greater in size than a columnar spacer in the first liquid crystal device.

14. The projection-type display apparatus according to claim 1, wherein
each liquid crystal device of the plurality of liquid crystal devices has a V1 in volume and a V2 in volume, the V1 in volume being the liquid crystal at the inner side of the seal material in each liquid crystal device and the V2 in volume being the liquid crystal in the display region in each liquid crystal device.

* * * * *